US011734624B2

(12) United States Patent
D'Attilio et al.

(10) Patent No.: US 11,734,624 B2
(45) Date of Patent: Aug. 22, 2023

(54) METHOD AND SYSTEM FOR SCALABLE CONTACT CENTER AGENT SCHEDULING UTILIZING AUTOMATED AI MODELING AND MULTI-OBJECTIVE OPTIMIZATION

(71) Applicant: Genesys Cloud Services, Inc., Menlo Park, CA (US)

(72) Inventors: William D'Attilio, Brownsburg, IN (US); German Andres Velasquez Diaz, Annapolis, MD (US); Wei Xun Ter, Silver Spring, MD (US); Bayu Wicaksono, Laurel, MD (US); I-Hsuan Weng, Gambrills, MD (US); Jay Michael Langsford, Indianapolis, IN (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 10 days.

(21) Appl. No.: 17/385,108

(22) Filed: Jul. 26, 2021

(65) Prior Publication Data
US 2022/0027837 A1     Jan. 27, 2022

Related U.S. Application Data

(60) Provisional application No. 63/055,934, filed on Jul. 24, 2020.

(51) Int. Cl.
*G06Q 10/0631* (2023.01)
*H04M 3/51* (2006.01)
*G06Q 10/04* (2023.01)

(52) U.S. Cl.
CPC ..... *G06Q 10/063116* (2013.01); *G06Q 10/04* (2013.01); *H04M 3/5175* (2013.01); *H04M 2203/402* (2013.01)

(58) Field of Classification Search
CPC ............................................. G06Q 10/063116
See application file for complete search history.

(56) References Cited

U.S. PATENT DOCUMENTS 6,272,483 B1    8/2001  Joslin et al.
7,539,627 B2 *  5/2009  Schmidt ......... G06Q 10/063116
                                                  705/7.22
(Continued)

OTHER PUBLICATIONS

Wolsey, Laurence A.; Integer programming; 1998; John Wiley & Sons, Inc.
(Continued)

*Primary Examiner* — Andre D Boyce
(74) *Attorney, Agent, or Firm* — Taft Stettinius & Hollister LLP

(57) ABSTRACT

A system for performing contact center agent scheduling according to an embodiment includes at least one processor and at least one memory comprising a plurality of instructions stored thereon that, in response to execution by the at least one processor, causes the system to generate a workload forecast indicative of a demand that will be introduced into the contact center in a future planning period based on a workload forecast model and time series data, generate a staffing requirement forecast indicative of a number of agents required to handle the workload forecast based on the workload forecast, one or more service goals, and a staffing requirement model, and perform schedule optimization using column generation to generate an optimized contact center agent shift schedule for a plurality of agents based on the staffing requirement forecast and one or more constraints.

20 Claims, 13 Drawing Sheets

(56) References Cited

U.S. PATENT DOCUMENTS

| | | | | |
|---|---|---|---|---|
| 7,725,339 | B1* | 5/2010 | Aykin | G06Q 10/10 |
| | | | | 705/7.14 |
| 8,332,249 | B1* | 12/2012 | Aykin | G06Q 10/0631 |
| | | | | 705/7.14 |
| 8,386,639 | B1* | 2/2013 | Galvin | G06Q 10/06 |
| | | | | 705/7.14 |
| 10,298,756 | B2 | 5/2019 | Gouw et al. | |
| 10,462,299 | B2 | 10/2019 | Ter et al. | |
| 2003/0009520 | A1* | 1/2003 | Nourbakhsh | H04M 3/5233 |
| | | | | 709/204 |
| 2007/0198323 | A1* | 8/2007 | Bourne | G06Q 10/0639 |
| | | | | 705/7.41 |
| 2007/0198330 | A1* | 8/2007 | Korenblit | G06Q 10/0631 |
| | | | | 705/7.42 |
| 2007/0206768 | A1* | 9/2007 | Bourne | G06Q 10/0631 |
| | | | | 379/265.01 |
| 2008/0002823 | A1* | 1/2008 | Fama | H04M 3/5233 |
| | | | | 379/265.12 |
| 2008/0300954 | A1* | 12/2008 | Cameron | G06Q 10/1097 |
| | | | | 705/7.21 |
| 2009/0089136 | A1 | 4/2009 | Minert et al. | |
| 2010/0165977 | A1* | 7/2010 | McCord | H04M 3/5238 |
| | | | | 370/352 |
| 2012/0087486 | A1* | 4/2012 | Guerrero | G06Q 10/0631 |
| | | | | 703/6 |
| 2014/0278649 | A1* | 9/2014 | Guerinik | G06Q 10/0631 |
| | | | | 705/7.16 |
| 2019/0130329 | A1 | 5/2019 | Fama et al. | |
| 2020/0394594 | A1* | 12/2020 | Dvorscak, Jr. | G06Q 10/04 |

OTHER PUBLICATIONS

Lübbecke, Marco E. et al.; Selected Topics in Column Generation; Operations Research; Nov.-Dec. 2005; pp. 1007-1023; vol. 53, No. 6; Informs.

Desrosiers, Jacques et al.; A Primer in Column Generation; Column Generation; 2005; 29 pages.

Kalvelagen, Ewin; Employee Scheduling II: column generation; available at yetanothermathprogrammingconsultant.blogspot.com/2017/01/employee-scheduling-ii-column-generation.html; last accessed Aug. 10, 2021; 5 pages.

Volland, Jonas et al.; A column generation approach for the integrated shift and task scheduling problem of logistics assistants in hospitals; European Journal of Operational Research; pp. 316-334; 2017; vol. 260; Elsevier B.V.

Türker, Turgay et al.; An Integrated Approach for Shift Scheduling and Rostering Problems with Break Times for Inbound Call Centers; Mathematical Problems in Engineering; Nov. 21, 2018; vol. 2018; 19 pages; Hindawi.

Laborie, Philippe et al.; IBM ILOG CP optimizer for scheduling; Constraints; Mar. 19, 2018; pp. 210-250; vol. 23; Springer Science+Business Media, LLC.

IBM; Flight pairing; available at https://www.ibm.com/docs/en/icos/12.8.0.0?topic=library-transportation#usroplsamples.uss_opl_modlib.1016594__FlightPairing-145; last accessed Aug. 10, 2021; 7 pages.

Panicker, Aneesha et al.; Efficient Programming of Large Models; Dec. 10, 2013; 43 pages; IBM Software Group.

Laborie, Philippe; Introduction to CP Optimizer for Scheduling; Jun. 20, 2017; 244 pages; IBM Corporation.

Laborie, Philippe; IBM ILOG CP Optimizer for Detailed Scheduling Illustrated on Three Problems; CPAIOR 2009; 2009; pp. 148-162; Springer-Verlag Berlin Heidelberg.

Laborie, Philippe; Planning/Scheduling with CP Optimizer; Oct. 3, 2019; 65 pages; IBM Corporation.

Wikipedia; NP-hardness; available at https://en.wikipedia.org/wiki/NP-hardness; last accessed Aug. 10, 2021; 4 pages.

Wikipedia; Column generation; available at https://en.wikipedia.org/wiki/Column_generation; last accessed Aug. 10, 2021; 1 page.

Makridakis, Spyros et al.; The M3-Competition: results, conclusions and implications; International Journal of Forecasting; 2000; pp. 451-476; vol. 16; Elsevier Science B.V.

Wikipedia; Dantzig-Wolfe decomposition; available at https://en.wikipedia.org/wiki/Dantzig-Wolfe_decomposition; last accessed Aug. 10, 2021; 4 pages.

Wikipedia; Pareto efficiency: available at https://en.wikipedia.org/Wiki/Pareto_efficiency; last accessed Aug. 10, 2021; 11 pages.

International Preliminary Report on Patentability; IPEA/US; International Application No. PCT/US2021/043132; Jul. 25, 2022; 27 pages.

International Search Report and Written Opinion of the International Searching Authority; The International Searching Authority; International Application No. PCT/US2021/043132; dated Nov. 4, 2021; 7 pages.

* cited by examiner

| Constraint | Definition |
|---|---|
| `doNotChangeDailyPaidTime` | When rescheduling, do not change the amount of paid time per day |
| `doNotChangeShiftStartTime` | When rescheduling, do not change the shift start times |
| `doNotChangeWeeklyPaidTime` | When rescheduling, do not change the amount of paid time per week |
| `doNotRescheduleShift` | When rescheduling, do not change the shift (start or length) |
| `doNotRescheduleActivity` | When rescheduling, do not change the activity (start or length) |
| `minimumWeeklyPaidTimeMinutes` | Minimum paid time per week |
| `maximumWeeklyPaidTimeMinutes` | Maximum paid time per week |
| `minimumIntershiftTimeMinutes` | Minimum time between shift end and next shift start |
| `minimumShiftStartDistanceMinutes` | Minimum time between shift start and next shift start |
| `paidTimeGranularityMinutes` | Daily paid time must be a multiple of the granularity |
| `minimumWorkingDaysPerWeek` | Minimum number of working days per week |
| `maximumWorkingDaysPerWeek` | Maximum number of working days per week |
| `maximumConsecutiveWorkingDays` | Maximum number of consecutive working days |
| `minimumConsecutiveNonWorkingTimePerWeekMinutes` | Each week must have at least one "rest" of minimum length |
| `maximumConsecutiveWorkingWeekends` | Minimum number of consecutive working weekends (either day worked) |
| `optionalDays` | Days that work is optional |
| `shifts` | For every day, agent must work a shift in this list |
| `minimumPlanningPeriodDaysOff` | Minimum number of days off per planning period |
| `maximumPlanningPeriodDaysOff` | Maximum number of days off per planning period |
| `minimumPlanningPeriodPaidTimeMinutes` | Minimum paid time per planning period |
| `maximumPlanningPeriodPaidTimeMinutes` | Maximum paid time per planning period |
| `earliestShiftStartTimeMinutesFromMidnight` | Earliest time a shift can start |
| `latestShiftStartTimeMinutesFromMidnight` | Latest time a shift can start |

FIG. 10

| Constraint | Definition |
|---|---|
| `earliestShiftStopTimeMinutesFromMidnight` | Earliest time a shift can stop |
| `latestShiftStopTimeMinutesFromMidnight` | Latest time a shift can stop |
| `shiftStartTimeIncrementInMinutes` | Shift start time must be a multiple of the increment |
| `minimumPaidTimeMinutes` | Minimum paid time for this shift |
| `maximumPaidTimeMinutes` | Maximum paid time for this shift |
| `minimumContiguousTimeMinutes` | Minimum time an agent can work before a break |
| `maximumContiguousTimeMinutes` | Maximum time an agent can work before a break |
| `dayOffRule` | An enumerated type that dictates whether after receiving this shift, if you must have the next day off, previous day off, or must work the next day. |
| `earliestActivityStartTimeMinutesFromShiftStart` | If the activity uses relative times, the earliest time an activity can start after the shift starts |
| `latestActivityStartTimeMinutesFromShiftStart` | If the activity uses relative times, the latest time an activity can start after the shift starts |
| `earliestActivityStartTimeMinutesFromMidnight` | If the activity uses absolute times, the earliest time an activity can start |
| `latestActivityStartTimeMinutesFromMidnight` | If the activity uses absolute times, the latest time an activity can start |
| `minimumLengthFromShiftStartMinutes` | Minimum amount of time between shift start and activity start |
| `minimumLengthFromShiftEndMinutes` | Minimum amount of time between activity end and shift end |
| `activityStartTimeIncrementInMinutes` | Activity start time must be a multiple of this increment |
| `maximumVarianceMinutes` | Each week, for every applicable day, for all other applicable days, the pairwise absolute value of the difference in start times must be less than *value*. |
| `paidDuration` | Each week, for all applicable days, the paid time must be equal |

FIG. 11

METHOD AND SYSTEM FOR SCALABLE CONTACT CENTER AGENT SCHEDULING UTILIZING AUTOMATED AI MODELING AND MULTI-OBJECTIVE OPTIMIZATION

CROSS-REFERENCE TO RELATED APPLICATIONS

This application claims priority to and the benefit of U.S. Provisional Application No. 63/055,934, titled "Method and System for Scalable Contact Center Agent Scheduling Utilizing Automated AI Modeling and Multi-Objective Optimization," filed on Jul. 24, 2020, the contents of which are incorporated herein by reference in their entirety.

BACKGROUND

Contact centers operate with competing goals—they want to provide the best service they can to their customers, while also saving cost. To this end, contact centers typically employ agents and subsequently schedule them to handle an expected workload. The times these agents can work is constrained by labor laws, individual contracted agreements, and/or other factors.

It is important to find a good match between predicted workload and scheduled workforce, as an inadequately sized workforce can lead to low service levels and long wait times. One way to avoid this would be by scheduling a sufficiently large number of employees. However, it is typically undesirable to over-schedule employees, because contact centers must also meet economic objectives (e.g., minimizing labor cost). Consequently, the cost reductions obtained from leveraging scheduling technologies can be substantial.

Resource scheduling is a well-known problem proven to be NP-Hard. As such, as the problem grows, the time it takes likely grows faster than a polynomial. It is therefore extremely difficult to find good solutions to these highly constrained and complex scheduling problems in a timely manner. It is even more difficult to determine the most optimal solution that minimizes costs, meets employee preferences, distributes shifts equally among employees, and at the same time satisfies all the workplace/business constraints.

SUMMARY

One embodiment is directed to a unique system, components, and methods for performing contact center agent scheduling. Other embodiments are directed to apparatuses, systems, devices, hardware, methods, and combinations thereof for performing contact center agent scheduling.

According to an embodiment, a system for performing contact center agent scheduling may include at least one processor and at least one memory comprising a plurality of instructions stored thereon that, in response to execution by the at least one processor, causes the system to generate a workload forecast indicative of a demand that will be introduced into the contact center in a future planning period based on a workload forecast model and time series data, generate a staffing requirement forecast indicative of a number of agents required to handle the workload forecast based on the workload forecast, one or more service goals, and a staffing requirement model, and perform schedule optimization using column generation to generate an optimized contact center agent shift schedule for a plurality of agents based on the staffing requirement forecast and one or more constraints.

In some embodiments, each column added during the column generation may correspond with a prospective shift schedule.

In some embodiments, the one or more constraints may include at least one of a maximum shift duration, an earliest shift starting time, or a latest shift finishing time.

In some embodiments, the plurality of instructions may further cause the system to automatically generate one of a batch process workload forecast model or an ad hoc workload forecast model based on automatic call distribution data of the contact center.

In some embodiments, to automatically generate one of the batch process workload forecast model or the ad hoc workload forecast model may include to receive historical time series data to be forecasted, perform hierarchical time dimension extraction, perform outlier detection and pattern recognition, and compare forecasting methodologies using cross-validation with multiple folds for multiple validation time horizons.

In some embodiments, to perform outlier detection and pattern recognition may include to detect seasonality and trends in the data.

In some embodiments, to perform schedule optimization using column generation may include to solve a relaxed master problem and add columns until at least one termination criteria has been satisfied.

In some embodiments, the at least one termination criteria may include a determination that no new columns are available to add or a determination that a threshold number of iterations of column generation has been reached.

In some embodiments, the system may further include or be embodied as a contact center system, and the plurality of instructions may further cause the system to automatically incorporate the optimized contact center agent shift schedule into the contact center system.

According to another embodiment, one or more non-transitory machine-readable storage media may include a plurality of instructions stored thereon that, in response to execution by at least one processor, causes a system to generate a workload forecast indicative of a demand that will be introduced into a contact center in a future planning period based on a workload forecast model and time series data, generate a staffing requirement forecast indicative of a number of agents required to handle the workload forecast based on the workload forecast, one or more service goals, and a staffing requirement model, and perform schedule optimization using column generation to generate an optimized contact center agent shift schedule for a plurality of agents based on the staffing requirement forecast and one or more constraints.

In some embodiments, each column added during the column generation may correspond with a prospective shift schedule.

In some embodiments, the one or more constraints may include at least one of a maximum shift duration, an earliest shift starting time, or a latest shift finishing time.

In some embodiments, the plurality of instructions may further cause the system to automatically generate one of a batch process workload forecast model or an ad hoc workload forecast model based on automatic call distribution data of the contact center.

In some embodiments, to automatically generate one of the batch process workload forecast model or the ad hoc workload forecast model may include to receive historical time series data to be forecasted, perform hierarchical time dimension extraction, perform outlier detection and pattern recognition, and compare forecasting methodologies using cross-validation with multiple folds for multiple validation time horizons.

In some embodiments, to perform outlier detection and pattern recognition may include to detect seasonality and trends in the data.

In some embodiments, to perform schedule optimization using column generation may include to solve a relaxed master problem and add columns until at least one termination criteria has been satisfied.

In some embodiments, the at least one termination criteria may include a determination that no new columns are available to add or a determination that a threshold number of iterations of column generation has been reached.

According to yet another embodiment, a method of performing contact center agent scheduling may include generating, by a contact center system, a workload forecast indicative of a demand that will be introduced into the contact center in a future planning period based on a workload forecast model and time series data, generating, by the contact center system, a staffing requirement forecast indicative of a number of agents required to handle the workload forecast based on the workload forecast, one or more service goals, and a staffing requirement model, and performing, by the contact center system, schedule optimization using column generation to generate an optimized contact center agent shift schedule for a plurality of agents based on the staffing requirement forecast and one or more constraints.

In some embodiments, each column added during the column generation may correspond with a prospective shift schedule.

In some embodiments, performing schedule optimization using column generation may include solving a relaxed master problem and adding columns until at least one termination criteria has been satisfied.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 10-11 illustrate a table that identifies example shift constraints and corresponding definitions used in sub-problems;

DETAILED DESCRIPTION

Figure 1:
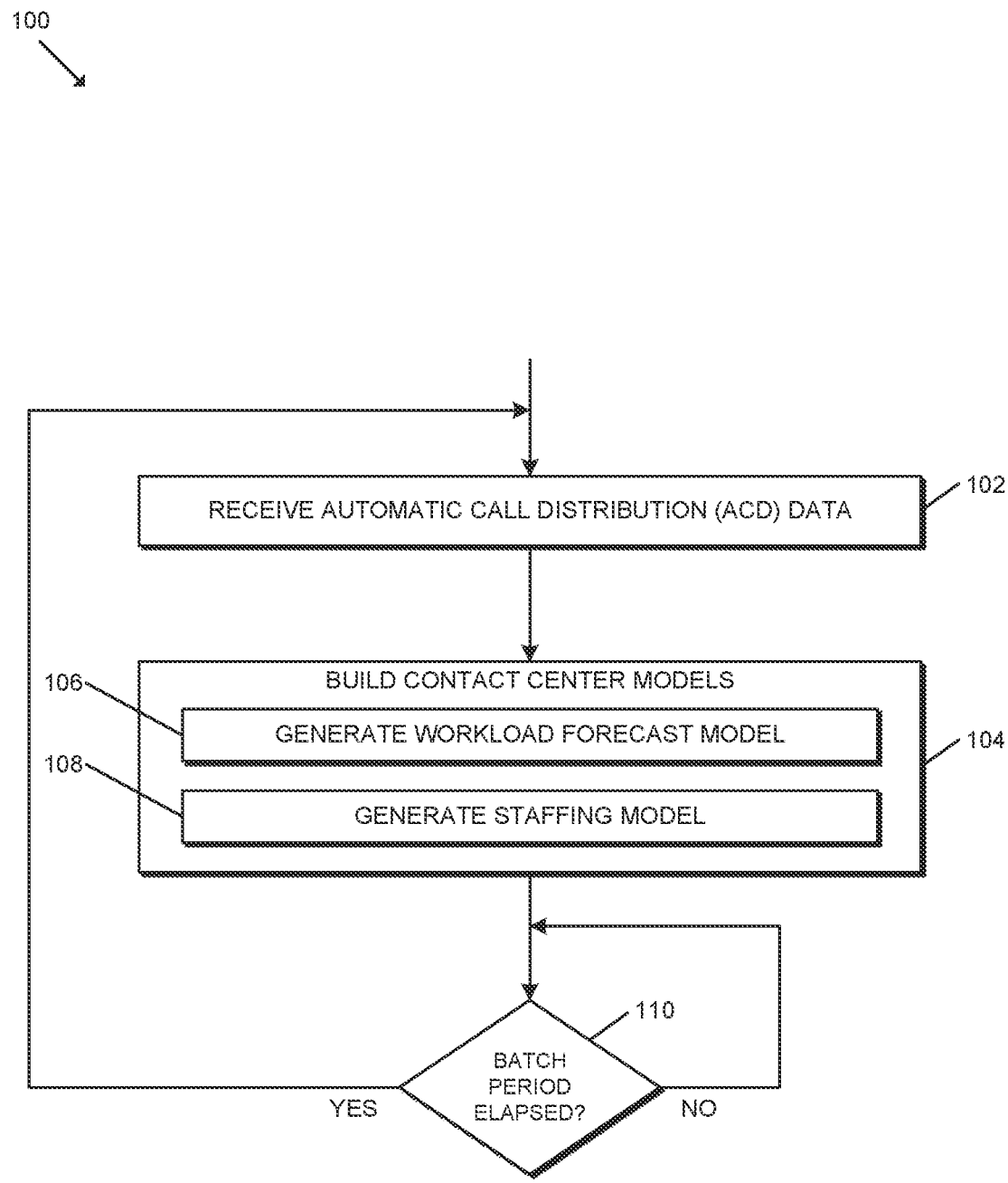
FIG. 1 is a simplified flow diagram of at least one embodiment of a method of performing a periodic model building batch process.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As described above, as the problem of contact center scheduling grows, the scheduling optimization model can become too large to solve in a reasonable amount of time using traditional techniques. Accordingly, the technologies described herein leverage automated and validated AI forecasting and modeling, coupled with column generation, to create a scalable, multi-objective agent scheduling system able to handle very large cases and a variety of goals. More specifically, in some embodiments, the technologies leverage a state-of-the art solver (e.g., IBM ILOG CPLEX) with a contact-center specific scheduling algorithm that takes workload and staffing requirement forecasts generated by the AI models as inputs, and uses column generation with linear programming (LP) for optimizing a set of specific objectives master problem (e.g., service performance, agent preference, paid cost, etc.) and constraint programming (CP) for solving sub-problems that find potential candidates of best agent shifts. Further, in the illustrative embodiment, a high-leverage modeling language (e.g., Optimization Programming Language (OPL) is used, which allows for seamless extension with more functionalities and capabilities (e.g., new constraints, automatic self-scheduling, etc.).

As described below, the technologies described herein involve determining the expected number of workload interactions (e.g. calls, emails, chats, back-office work, etc.) as well as the service time associated with those interactions (e.g., average handle time) in the planning horizon, converting the workload predictions from the first phase into a staffing or headcount requirement for the future planning horizon, and performing scheduling in which the headcount requirement is fulfilled through placement of staff throughout the planning horizon according to shift and schedule constraints, such that the final output is a schedule or roster that optimizes (or sub-optimizes) the coverage of workload with staffed agents.

In some embodiments, a system may leverage a big data infrastructure (e.g., using Apache Hadoop and Spark) to automatically build and validate both workload forecasting models and staffing requirement models. In doing so, the system may ingest archived events and historical aggregated data from a contact center platform (e.g., the contact center system 1200), and batch-process build the models for all customers, all queue streams, using data from beginning of time until the current time. The batch-process build may be performed on a nightly basis (or according to another period), thereby providing a closed feedback loop for continuous model improvements. These models may then be used at inference time when an API request is processed by the corresponding service(s).

Referring now to FIG. 1, in use, a system may execute a method 100 of performing a period model building batch process. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 100 are illustrated by way of example, and such blocks may be combined or divided, added or removed, and/or reordered in whole or in part depending on the particular embodiment, unless stated to the contrary.

The illustrative method 100 begins with block 102 in which the system receives automatic call distribution (ACD) data. For example, the ACD data may include contact volume, average handle time, full time equivalency (FTE), capture rate, contact handling data for contact types, contact handling data for staffing types, and/or other relevant ACD data for a specified interval.

In block 104, the system builds one or more contact center models for use in performing contact center scheduling. In particular, in block 106, the system may generate a workload forecast model and, in block 108, the system may generate a staffing model. It should be appreciated that the workload forecast model and/or the staffing model may be generated according to any suitable algorithm and/or technique. For example, in some embodiments, the workload forecast model may be generated according to a method similar to that described in reference to the method 400 of FIGS. 4-5. Further, the workload forecast model and/or the staffing model may be formatted or represented in any matter that may be used by the system as described herein. In some embodiments, the workload forecast model may be embodied as a model that is representative of predictions regarding how contact center workloads (e.g., across the contact center system 1200) may vary over time. Further, it should be appreciated that the workload forecast model may include multiple different time granularities (e.g., 15-minute, 30-minute, etc.). In some embodiments, the staffing model may be embodied as a model that is representative of predictions regarding how staffing requirements adjust to satisfy various workloads.

In block 110, the system determines whether a batch period has elapsed. If so, the method 100 returns to block 102 in which the system again receives a new batch of ACD data for processing as described above. For example, the batch period may be one day, two days, a period of hours, or another predefined period. In other embodiments, the method 100 may be re-executed in response to satisfaction of one or more other criteria. In the illustrative embodiment, it should be appreciated that the system executes the method 100 as part of a nightly batch process.

Although the blocks 102-110 are described in a relatively serial manner, it should be appreciated that various blocks of the method 100 may be performed in parallel in some embodiments.

Figure 2:
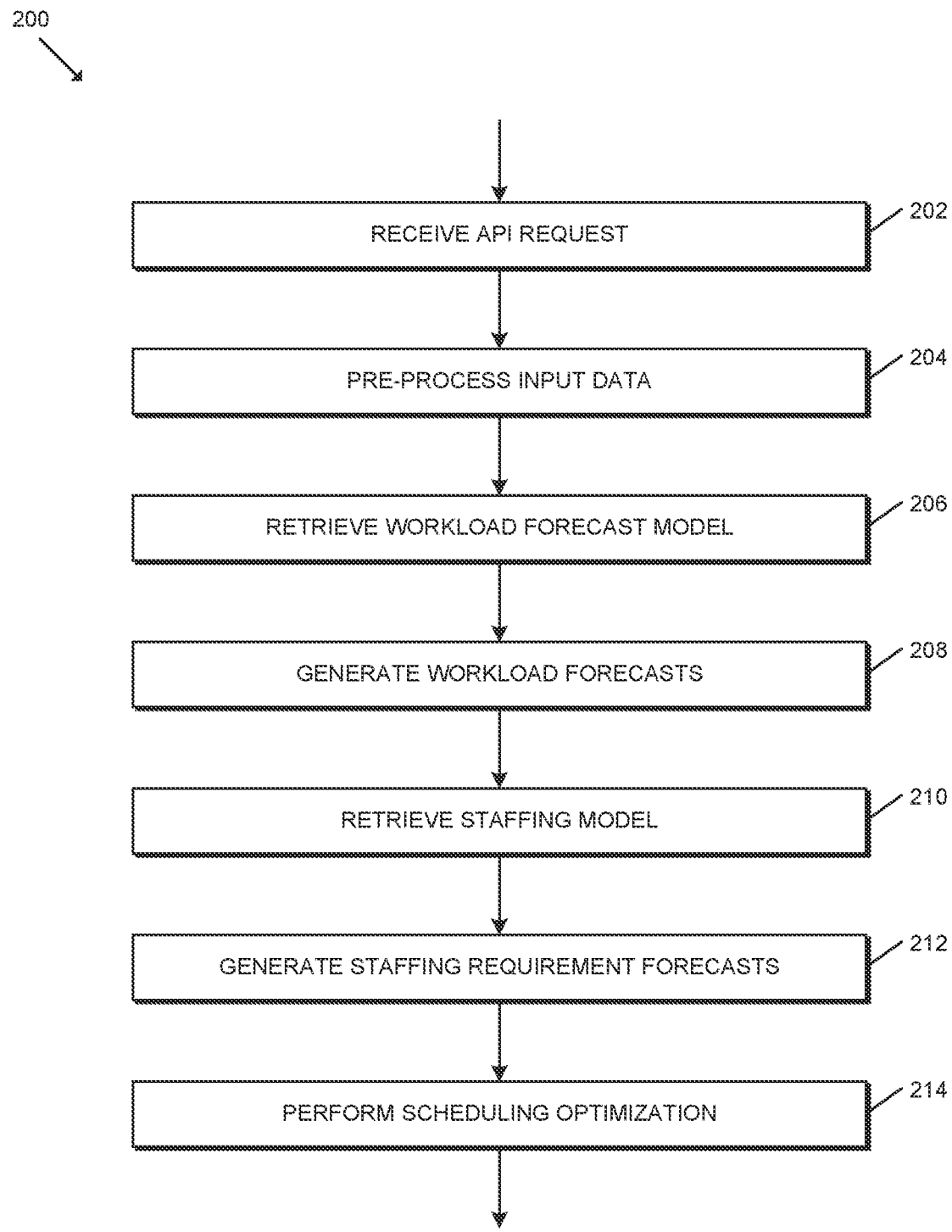
FIG. 2 is a simplified flow diagram of at least one embodiment of a method of performing contact center agent scheduling.

Referring now to FIG. 2, in use, a system may execute a method 200 of performing contact center agent scheduling. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 200 are illustrated by way of example, and such blocks may be combined or divided, added or removed, and/or reordered in whole or in part depending on the particular embodiment, unless stated to the contrary.

The illustrative method 200 begins with block 202 in which the system receives an API request is made (e.g., for an optimized contact center agent schedule). In block 204, one or more input data (e.g., ACD data, API request data, and/or other data) may be pre-processed. In block 206, the system retrieves the relevant workload forecast model and, in block 208, the system generates the workload forecasts based on the workload forecast model. For example, in some embodiments, it should be appreciated that the system may execute the method 300 of FIG. 3 described below in order to retrieve the workload forecast model and generate the workload forecasts. However, it should be appreciated that the system may otherwise retrieve the relevant model and/or generate the workload forecasts in other embodiments.

In block 210, the system retrieves the relevant staffing model and, in block 212, the system generates staffing requirement forecasts based on the staffing model. For example, in some embodiments, it should be appreciated that the system may execute the method 700 of FIG. 7 described below in order to retrieve the staffing model and generate the staffing requirement forecasts. However, it should be appreciated that the system may otherwise retrieve the relevant model and/or generate the staffing requirement forecasts in other embodiments.

In block 214, the system performs scheduling optimization in order to generate an optimized contact center agent schedule. In some embodiments, to do so, it should be appreciated that the system may execute the method 800 of FIG. 8 described below. However, it should be appreciated that the system may otherwise perform the scheduling optimization in other embodiments.

Although the blocks 202-214 are described in a relatively serial manner, it should be appreciated that various blocks of the method 200 may be performed in parallel in some embodiments.

Figure 3:
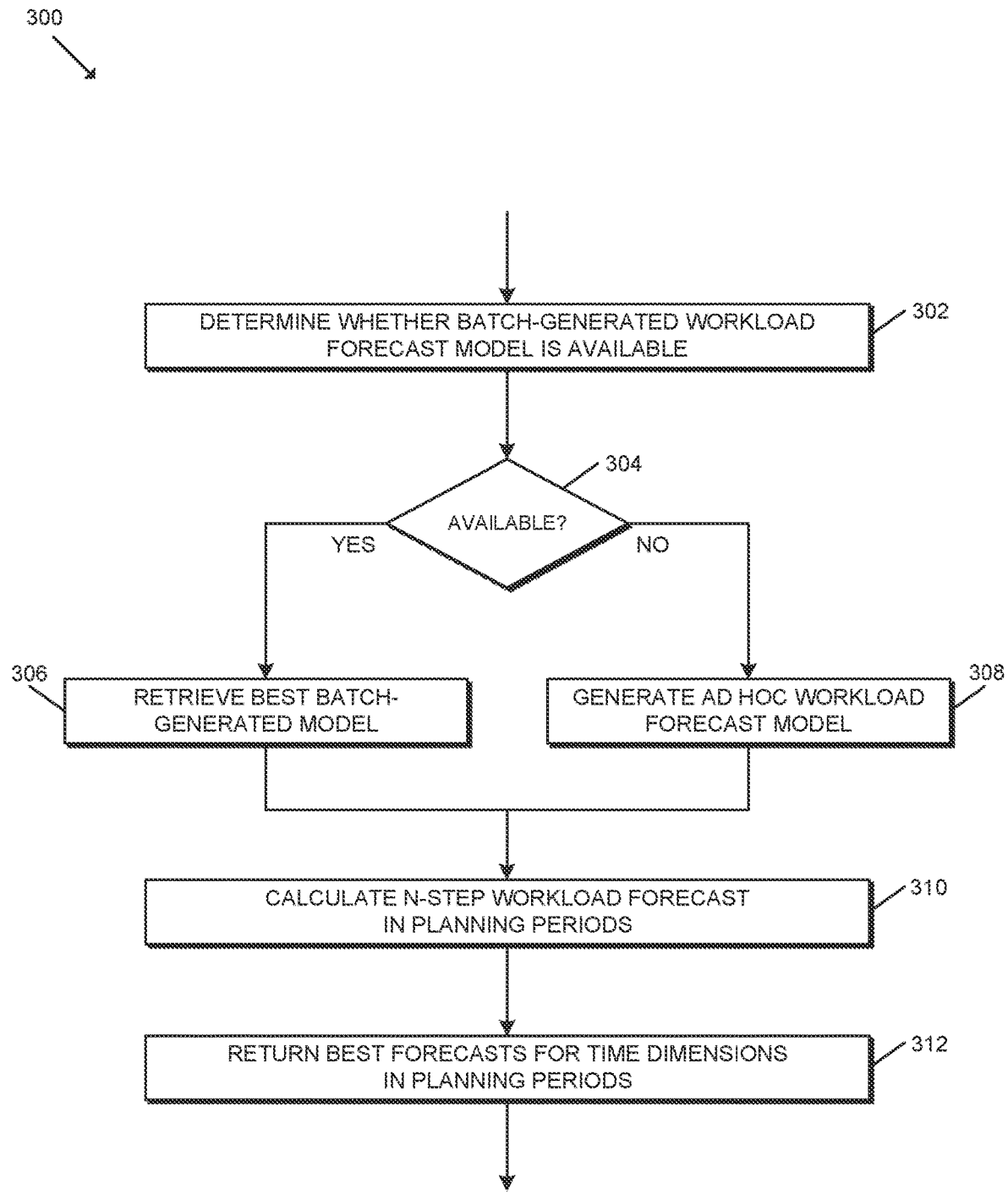
FIG. 3 is a simplified flow diagram of at least one embodiment of a method of processing a workload forecasting request.

Referring now to FIG. 3, in use, a system may execute a method 100 of processing a workload forecasting request. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the system determines whether a batch-generated workload forecast model is available. As described above in reference to the method 100 of FIG. 1, it should be appreciated that the system may periodically (e.g., nightly) perform a batch process for building/updating a workload forecast model based on available ACD data. However, in some circumstances, it is possible that the workload forecast model from the previous night's batched process is unavailable (e.g., due to an error, due to a change in the configuration of the contact center system queues, due to a systemic change in the routing strategy, etc.). A workload forecasting model may be defined as the best method to apply given time series data and a set of optimal parameters that yield optimal key performance indicator (KPI) metrics used to validate the accuracy of the forecast. These models may then be saved in a data persistence layer (e.g., such as AWS S3 or DynamoDB) to be used for any workload forecasting requests to be processed the next day.

If the system determines, in block 304, that a batch-generated workload forecast model is available, the method 300 advances to block 306 in which the system retrieves the best batch-generated model available. However, if the system determines, in block 304, that a batch-generated workload forecast model is unavailable, the method 300 advances to block 308 in which the system generates an ad hoc workload forecast model. It should be appreciated that the core algorithm for the ad hoc generation process may be the same as the algorithm executed during the nightly batched process, for example, to ensure that there is consistency in result quality from both processes. In some embodiments, in order to generate the ad hoc workload forecast model, the system may execute the method 400 of FIGS. 4-5. However, it should be appreciated that the ad hoc workload forecast model may be otherwise generated in other embodiments.

In block 310, the system calculates an n-step workload forecast in planning periods and, in block 312, the system returns the best forecasts for all hierarchical time dimensions in planning periods. In other words, the system predicts the workload or demand that will be introduced into the contact center system (e.g., the contact center system 1200) in future planning periods. It should be appreciated that a basic forecast may be specified as a sequence of metrics, such as volume offered and average handle time (AHT), corresponding to a time interval and can be generated for a multitude of time granularities (e.g., 5-minute intervals, 15-minute intervals, 30-minute intervals, or hourly intervals, etc.). As described below, the workload forecasts may, in turn, be converted into a staffing requirement forecast to be used in scheduling process.

Although the blocks 302-312 are described in a relatively serial manner, it should be appreciated that various blocks of the method 300 may be performed in parallel in some embodiments.

Figure 4:
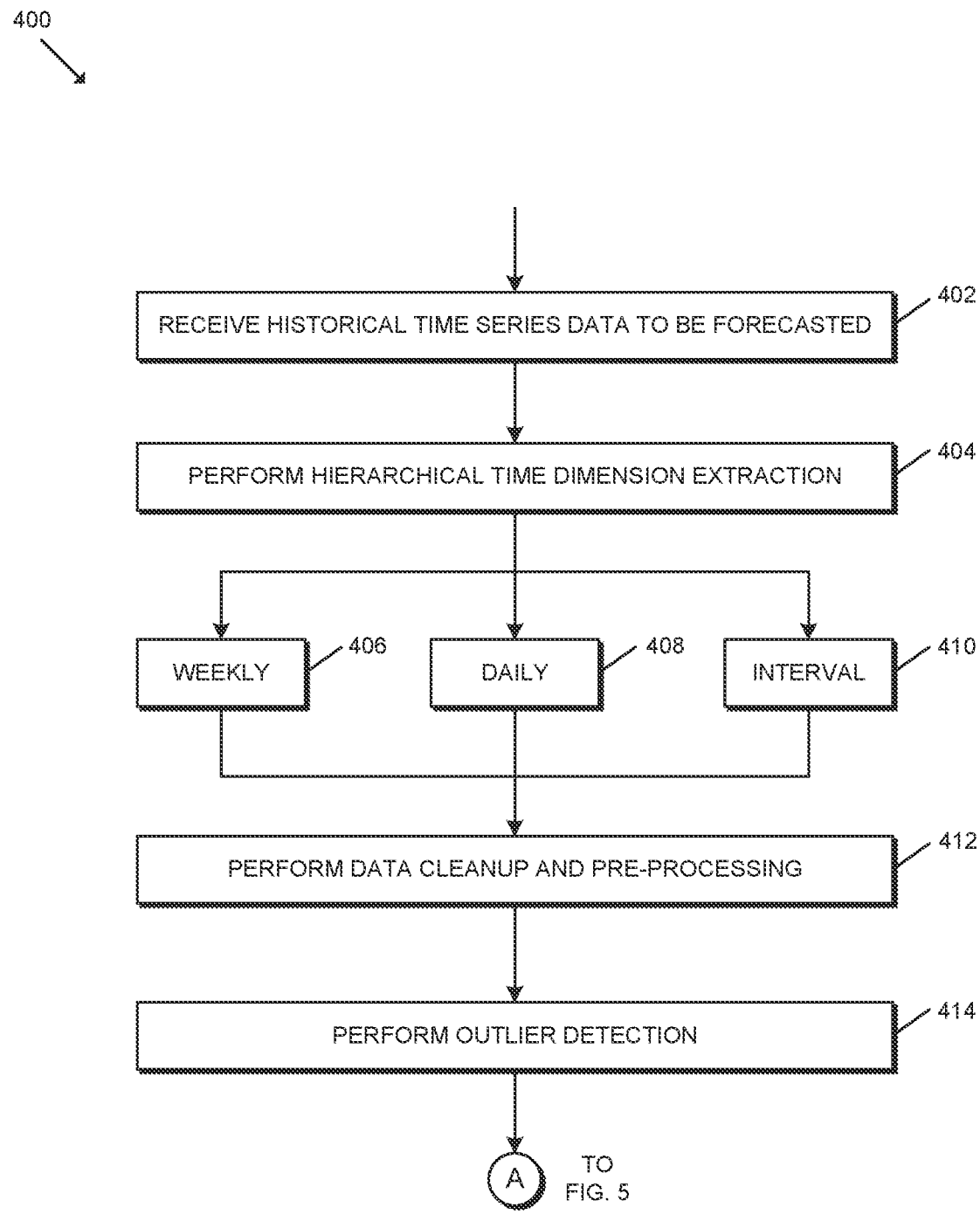
FIGS. 4-5 are a simplified flow diagram of at least one embodiment of a method of building a workload forecast model.
Figure 5:
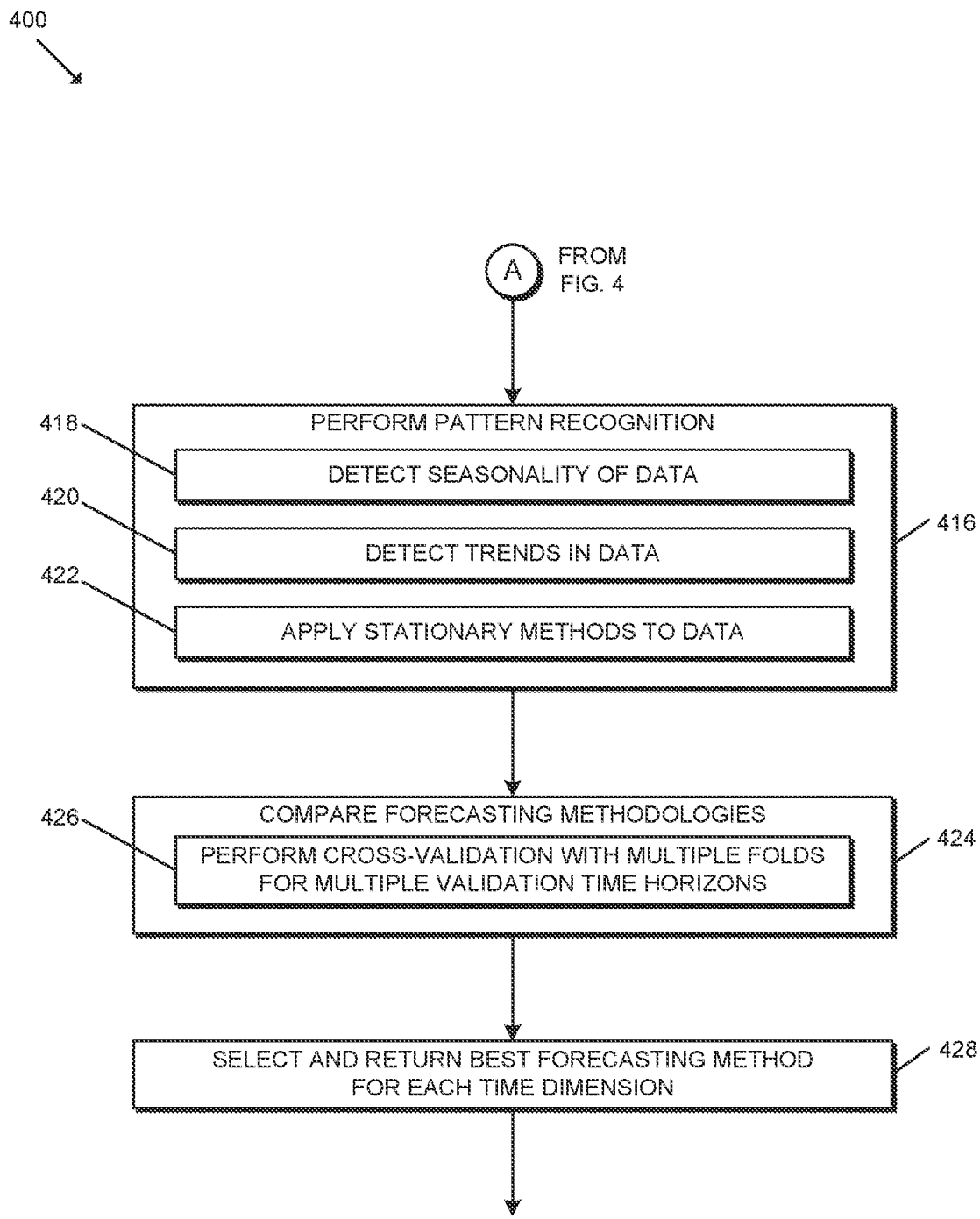

Referring now to FIGS. 4-5, in use, a system may execute a method 400 of building a workload forecast model. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 of FIG. 4 in which the system receives historical time series data to be forecasted, for example, along with causal and/or correlated time series as drivers or predictors to the forecast results. For example, in some embodiments, causal series may include the number of subscribers that drive the forecast of call volumes (as the number of subscribers increases, so does the expected calls being generated by those subscribers).

In block 404, the system performs hierarchical time dimension extraction. In other words, multiple hierarchies of temporal (or time-dimensional) time series streams may be created whenever a workload forecast request is made. For example, time series input data may be summarized and subsequently forecasted at different time hierarchies (or granularities) in order to gain better accuracy. In particular, as shown in the illustrative embodiment of FIGS. 4-5, the data may be forecasted according to weekly 406, daily 408, and/or another interval distribution 410 (e.g., hourly, 5-minute, 10-minute, 30-minute granularities, etc.). It should be appreciated that a lower granularity stream (e.g., weekly) may be used both to determine long-term seasonal and trend patterns as well as to serve as the baseline for the higher granularity forecasts (e.g., daily and interval-level) via distribution. For example, daily forecasting may be performed as a weekly-to-daily distribution rather than forecasting the raw numbers. Each of the different temporal streams may undergo as similar process as outlined herein.

In block 412, the system performs various data cleanup and pre-processing to the data. For example, in some embodiments, feature engineering and pre-processing may be performed on each of the time series data streams. In various embodiments, the data cleanup and pre-processing may include one or more of data summarization and aggregation, data cleanup such as missing data imputation, daylight savings time corrections, sparse data normalization, data transformation (e.g., such as logarithmic normalization), cold-start data problems, and/or other data cleanup and pre-processing functions.

In block 414, the system performs outlier detection to identify data points that are significantly different from other observations, for example, as outliers can cause significant problems in model building by resulting in highly skewed models. Thus, detecting and normalizing outliers is an important step towards obtaining a proper and accurate forecast. Outliers that occur on specific calendar days (e.g. holiday and trading day effects) may also detected. In some embodiments, the system may utilize a seasonal hybrid (ESD) algorithm, which builds upon a generalized ESD algorithm, for detecting anomalies/outliers in the data. Further, in some embodiments, the system may leverage iterative outlier detection, which is a customized approach tailored for contact center data aimed at detecting outliers in an iterative manner. The repeated recalibration of the outlier detection model allows for accurate and improved outlier detection in the data. In various embodiments, it should be appreciated that the system may utilize any suitable algorithm and/or technique to identifier outliers. Further, the system may discard the data points identified as being outliers.

In block 416 of FIG. 5, after the data is cleaned (e.g., including removal of outlier data), the system may perform pattern recognition, for example, to ensure data integrity and proper methods are selected for optimization. For example, in block 418, the system may detect the seasonality of data. In particular, in order to do so, the system may transform the data from the time domain into the frequency domain using an appropriate transformation (e.g., a Fourier transform). It should be appreciated that the resulting periodogram shows the "power" of each possible frequency. Spectral analysis may subsequently be performed to determine the most prominent frequency or frequencies (e.g., repeatable pattern(s)), which may be indicative of the seasonality of the data. In block 420, the system may detect trends in the data. For example, the system may utilize linear trend estimation by relating the observations to the times at which they occurred. Further, in block 422, the system may apply one or more stationary methods to the data.

In block 424, the system compares various forecasting methodologies based on the identified patterns. In doing so, in block 426, the system may perform cross-validation with multiple folds for multiple validation time horizons in some embodiments. In other words, depending on which patterns are detected, a multitude of statistical forecasting methodologies, categorized and applied according to the patterns found, may be applied, validated, and compared against one another (e.g., such as ARIMA, classical decomposition, dynamic regressions, Holt-Winters', and custom, proprietary forecasting methodologies).

In block 428, the system may select and return the best forecasting method for each time dimension. In particular, the system may select the single best method and its optimal hyper-parameters that minimize the forecast error while considering both short- and long-term cross-validation strategies as described herein. In other embodiments, a combination or an ensemble of methods may be selected by optimizing the weighting factor of each of the methods to yield the best forecast. For example, in some embodiments, the ensemble could be comprised from the best five methods (or any user-driven or system-provided number of methods) found during the cross-validation process.

Although the blocks 402-428 are described in a relatively serial manner, it should be appreciated that various blocks of the method 400 may be performed in parallel in some embodiments.

Figure 6:
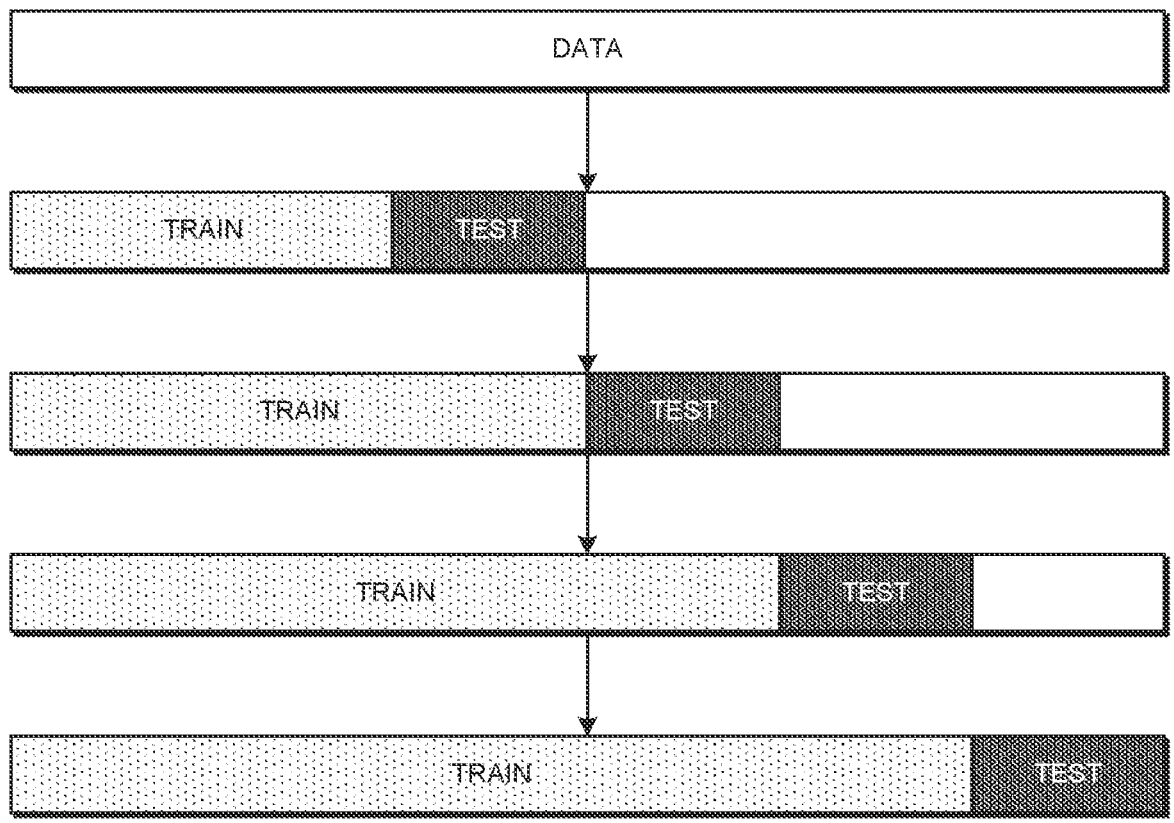
FIG. 6 is a simplified flow diagram of at least one embodiment of a method of performing four-fold "rolling horizon" cross-validation.

Referring now to FIG. 6, a simplified method 600 of performing four-fold "rolling horizon" cross-validation of data is shown. As described above, the best method may be selected using cross-validation with multiple folds (e.g., k-fold) for different validation time horizons. The criteria to be used may be based on a custom scoring that is a combination of accuracy metrics in the short term at 1- to 4-step-ahead forecasts (e.g., 1-4 weeks ahead), as well as long term over-the-horizon accuracy (e.g., 6-mo or 1-year ahead), depending on the availability of data. In some embodiments, the short-term horizon may be performed up to ten times, while the long horizon may be performed up to four times, depending on the size of the data. Further, this is done on a "rolling basis," in which the data is divided into "training data," where hyper-parameters for a method are optimized and fine-tuned to best "fit" the training data patterns, and "testing data," in which the best-fit method and its optimized parameters is "projected out" and evaluated for its accuracy against the testing data. The method 600 of FIG. 6 illustrates a four-fold version of this process. It should be appreciated that the process helps to ensure that the method selected is one that yields a workload forecast that holds well both on the short-term horizon and the long-term horizon. Consequently, in some embodiments, the resulting forecasts may be used for not only short-term, tactical planning such as scheduling, but also for long-term strategic planning such as a hiring and capacity planning.

Figure 7:
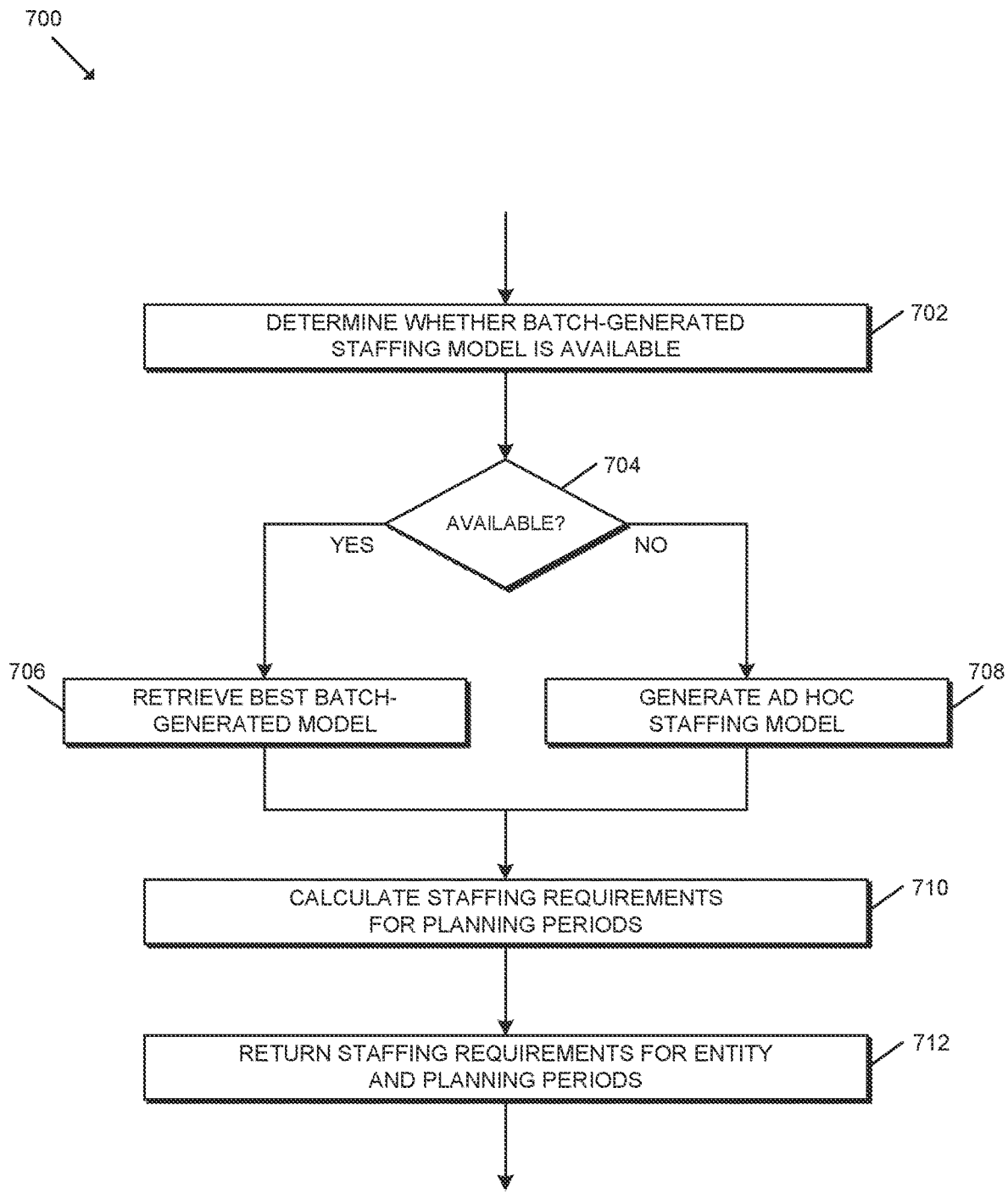
FIG. 7 is a simplified flow diagram of at least one embodiment of a method of processing a staffing requirement forecasting request.

Referring now to FIG. 7, in use, a system may execute a method 700 of processing a staffing requirement forecasting request. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 700 are illustrated by way of example, and such blocks may be combined or divided, added or removed, and/or reordered in whole or in part depending on the particular embodiment, unless stated to the contrary.

The illustrative method 700 begins with block 702 in which the system determines whether a batch-generated staffing model is available. As described above in reference to the method 100 of FIG. 1, it should be appreciated that the system may periodically (e.g., nightly) perform a batch process for building/updating a staffing model. However, in some circumstances, it is possible that the staffing model from the previous night's batched process is unavailable (e.g., due to an error, due to a change in the configuration of the contact center system queues, due to a systemic change in the routing strategy, etc.) as described above.

If the system determines, in block 704, that a batch-generated staffing model is available, the method 700 advances to block 706 in which the system retrieves the best batch-generated model available. However, if the system determines, in block 704, that a batch-generated workload forecast model is unavailable, the method 700 advances to block 708 in which the system generates an ad hoc staffing model. It should be appreciated that the core algorithm for the ad hoc generation process may be the same as the algorithm executed during the nightly batched process, for example, to ensure that there is consistency in result quality from both processes. In some embodiments, in order to generate the ad hoc staffing model, the system may execute a method similar to the method 400 of FIGS. 4-5 for generations of the ad hoc workload forecast model (with appropriate modifications). However, it should be appreciated that the ad hoc staffing model may be otherwise generated in other embodiments.

In block 710, the system calculates staffing requirements for planning periods and, in block 712, the system returns the staffing requirements for the requested entity and planning periods.

Although the blocks 702-712 are described in a relatively serial manner, it should be appreciated that various blocks of the method 700 may be performed in parallel in some embodiments.

In other words, after the workload and agent handle time (AHT), for example, have been forecasted for the planning horizon, the system may determine how many agents are required to handle the forecasted workload, given certain KPI goals (e.g., such as service level, average speed of answer (ASA), abandon rate, customer satisfaction score, etc.). In some embodiments, this is done at the same granularity that the schedule operates on (e.g., often 15-/30-/60-minute periods). In some embodiments, such staffing requirements are generated for each planning group. In some embodiments, the inputs for determining the staffing requirements may include the workload forecast, the routing configuration of the contact center system, and/or other inputs.

It should be appreciated that the system may utilize various methods to generate staffing forecasts. In particular, in some embodiments, the system may apply heuristics to determine, for example, staffing levels by assuming steady state arrivals in each time interval and smoothing the demand curves. Although this approach allows for significant control, heuristics can support only what are put into them, which often leads to sub-optimal solutions for failing to consider every valid combination and permutation of potential solutions in the problem space. In another embodiment, the system may utilize discrete-event simulation, which takes many practical factors into account. However, such approaches are often very computationally expensive and time-consuming. Sometimes queuing models and simulation are combined to obtain ideal staff requirements. In yet another embodiment, the system may utilize the Erlang-C queuing model, which often performs well for many contact center applications. It should be appreciated that queuing models are elegant and may provide good theoretical and analytical results, but they are often lacking in terms of accuracy in real-world conditions when considering multi-skilled agents, abandonments (e.g., Erlang-C assumes no one abandons their calls), complex routing strategies, non-voice interactions, and/or other real-world conditions.

In the illustrative embodiment, however, the system utilizes custom mathematical modeling via a data-driven, machine learning based approach, validated against historical ACD data, by combining the best of the options described above. The combination of queuing models with customer patience profiles, supporting different routing configurations of voice, chat, callback, email, casework, and/or back-office interactions allow for a robust and mathematically proven optimal solution.

Like with workload forecasting, a big data infrastructure is leveraged to use the latest available historical ACD data (e.g., the last 90 days) to automatically perform a nightly batch process of building and validating steady-state contact center models. The generated models are then subsequently used to calculate staffing requirements for the purposes of scheduling. As indicated above, the nightly batch process provides a closed feedback loop for improving model accuracy accounting for new ACD interactions of the day.

In the illustrative embodiment, the process of generating staffing requirement for each planning period starts with having the workload forecast as well as the KPI goals as inputs (e.g., service level, ASA, abandon rate, etc.). The system may leverage a service performance calculator built using the validated and optimized contact center model that takes in the workload forecast and the number of agents to produce a predicted set of KPIs. In order to get the optimal staffing requirement level, the number of agents may be increased iteratively (e.g., using a bisection algorithm) until the KPIs predicted by the calculator meet the desired, specified KPI goals. In some embodiments, in cases in which there are multiple KPI goals, all goals must be met. After all the optimal staffing requirements for each planning period have been computed, the system may optimize the schedules of shifts to match the available staffing to anticipated needs or requirements as described below.

Figure 8:
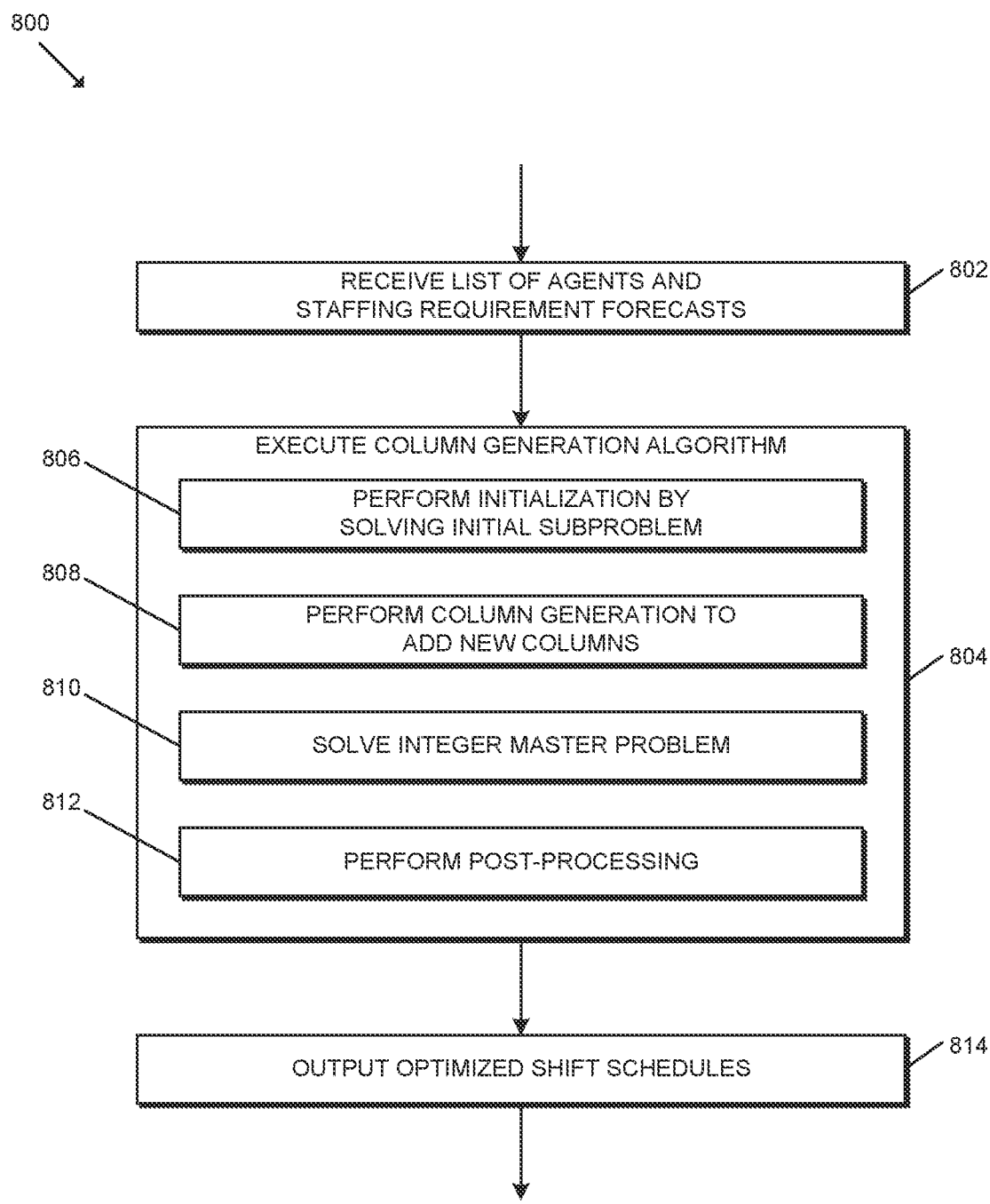
FIG. 8 is a simplified flow diagram of at least one embodiment of a method of performing scheduling optimization.

Referring now to FIG. 8, in use, a system may execute a method 800 of performing scheduling optimization. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 800 are illustrated by way of example, and such blocks may be combined or divided, added or removed, and/or reordered in whole or in part depending on the particular embodiment, unless stated to the contrary.

After staffing requirements are known from a previous phase, the system may derive shifts that can handle the requirements. Accordingly, the illustrative method 800 begins with block 802 in which the system receives/retrieves a list of agents and staffing request forecasts (e.g., in addition to the number of weeks/days to schedule). It should be appreciated that the list of agents may include, for example, working rules associated with the agents (e.g., work hours, regulatory requirements, etc.), capabilities of the respective agents (e.g., specializations in various areas, etc.), and/or other relevant criteria useful for deriving shifts from the staffing requirements and available agents. In other words, shift scheduling balances the problem of selecting what shifts are to be worked by each employee to meet workload requirements and hit certain KPI goals with adhering to various work plan constraints and state/national labor regulations (e.g., such as maximum shift duration, earliest shift starting time, latest finishing time, etc.). Depending on the constraints, agent preferences, and availability, the pool of feasible shifts can range from just a few possible combinations and permutations to billions of possible combinations and permutations.

As indicated above, modern contact center agent scheduling solutions also consider the fact that not all interactions can be handled by a single agent, and that different agents will have different skillsets and qualifications. Additionally, shift start times, shift lengths, breaks, and meals typically should vary in order to obtain "good" shifts that cover the workforce requirements adequately. Often, the shifts overstaff (i.e., exceed the requirements) in certain time intervals and under-staff in other time intervals based on the number of available agents and various, oftentimes conflicting, constraints. It should be appreciated that these nuances add complexity to the schedule optimization problem.

The system performs optimization based on the list of agents, staffing requirement forecasts, and/or other relevant data in order to generate shift schedules with the desired optimal (or approximately optimal output). It should be appreciated that an optimization problem can be represented as a matrix where each row corresponds to a constraint and each column corresponds to a decision variable. Standard optimization approaches such as linear programming and discrete optimization typically try to solve for all decision variables at once, which creates a scalability issue. However, in the illustrative embodiment, the system leverages column generation techniques to utilize a "divide-and-conquer" approach to data analysis, decomposing the original problem into smaller and easier-to-solve problems with fewer decision variables. For example, in some embodiments, the problem may be split using Dantzig-Wolfe decomposition and/or another suitable decomposition technology.

According, in block 804, the system executes a column generation algorithm in order to determine the optimized shift schedules. It should be appreciate that column generation involves solving a restricted problem (i.e., a problem with a subset of all potential solutions to choose from), and iteratively finding candidate columns to add to the potential solutions in the restricted problem until some criteria is met. The restricted problem may be referred to herein as the master problem and the problem(s) that are solved in order to find columns may be referred to herein as sub-problem(s).

In order to utilize column generation for scheduling, the system must have both a restricted version of the problem and a way to find columns. In the illustrative embodiment, a column is defined as the set of shifts assigned to an agent (i.e., a "shift schedule"). The master problem ensures that the shift schedules selected meet the requirements for each planning group, and the sub-problem finds shift schedules that meet the scheduling constraints. According to this technical arrangement, the system can use column generation to iteratively identify good candidate shift schedules for covering requirements (e.g., without having to enumerate all possibilities).

In the illustrative embodiment, the system utilizes an approach to shift scheduling via column generation that starts by finding feasible columns for each agent, and columns (e.g., three) are added as candidates to the relaxed master problem. In particular, the illustrative system solves the master problem and finds its dual values, which are subsequently used in the sub-problems further identify new columns that can benefit the coverage of requirements. Newly identified columns are added back to the master problem and solved. In some embodiments, this cycle may be repeated until one of the predefined termination criteria is met as described below. Then, in such embodiments, a final integer master problem may be solved to give every agent exactly one of the found shift schedules. Finally, the system may perform one or more post-processing steps to improve the quality and usability of the schedules. Table 1 presented below lists various column generation models that may be used in conjunction with the column generation algorithm described herein.

TABLE 1

Models Used in Column Generation Algorithm

| Name | Description | OR technique | Solver |
|---|---|---|---|
| MP - LP | Relaxed Master Problem | LP | IBM ILOG CPLEX |
| MP - IP | Integer Master Problem | MILP | IBM ILOG CPLEX |
| $S_{init}$ - SP | Initial Shift Schedule Sub-Problem | CP | IBM ILOG CP Optimizer |
| S - SP | Shift Schedule Sub-Problem | CP | IBM ILOG CP Optimizer |

As shown in FIG. 8, in the illustrative embodiment, execution of the column generation algorithm involves execution of sub-blocks 806, 808, 810, 812. In block 806, the system performs initialization by solving the initial sub-problem. More specifically, at initialization, the system may find at least one valid shift schedule for each agent or agent grouping, for example, by solving the initial sub-problem, $s_{init}$–SP, for each agent. In some embodiments, to speed up the process, the system may "chunk" agents into groupings of size N and calculate the reduced cost for each agent individually. If a valid shift schedule cannot be found for a particular agent, that agent is excluded. Valid shift schedules are passed to the relaxed master problem of the column generation.

In block 808, the system performs column generation to add new columns. In particular, the system may solve the relaxed master problem to finding and adding new columns until one or more termination criteria have been satisfied. To do so, in some embodiments, the system may execute the method 900 of FIG. 9.

Figure 9:
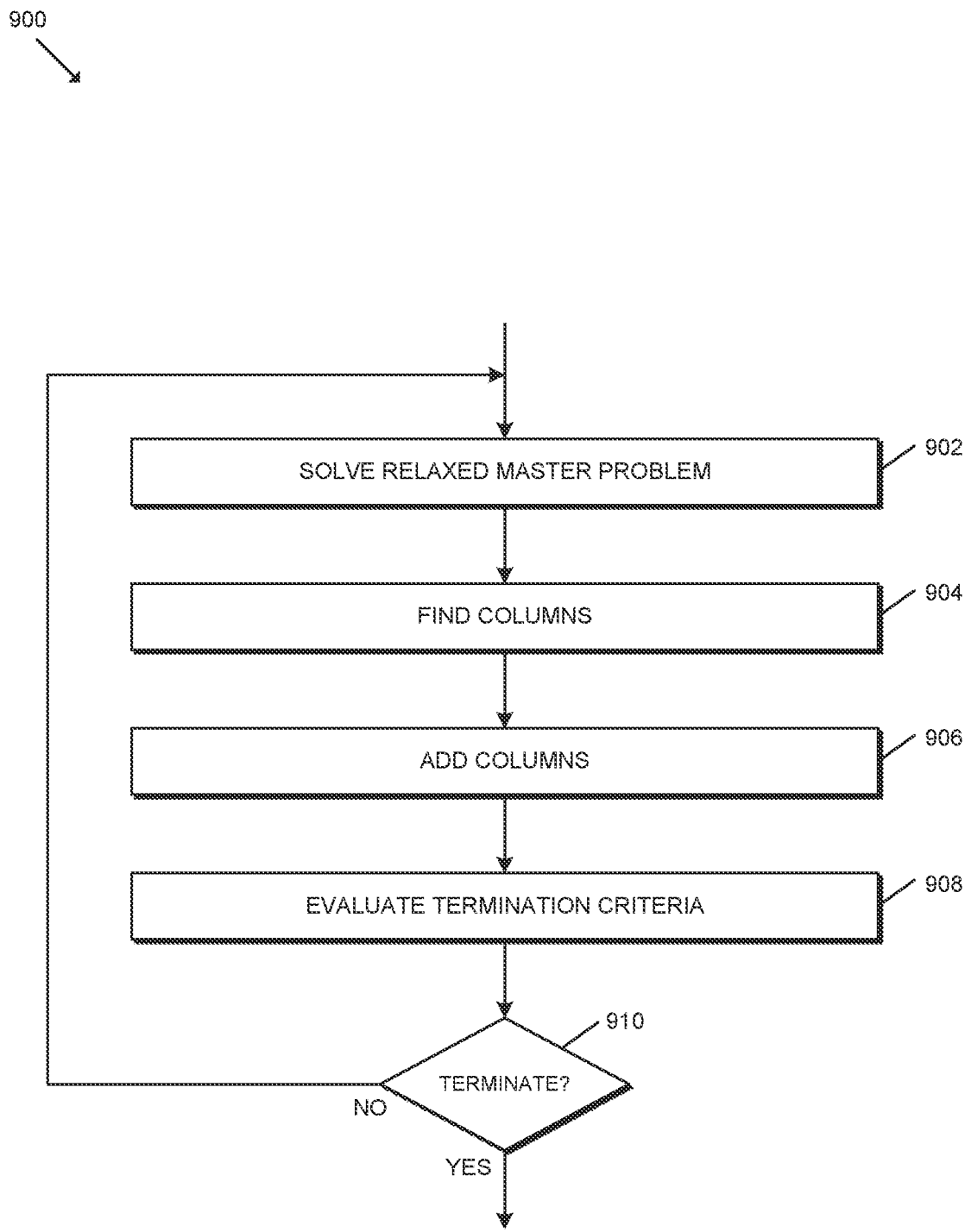
FIG. 9 is a simplified flow diagram of at least one embodiment of a method of performing column generation.

Referring now to FIG. 9, in use, a system may execute a method 900 of performing column generation. It should be appreciated that, in some embodiments, the system may be embodied as a computing device (e.g., the computing device 1300 of FIG. 13) and/or a contact center system (e.g., the contact center system 1200 of FIG. 12) or system/device thereof. It should be appreciated that the particular blocks of the method 900 are illustrated by way of example, and such blocks may be combined or divided, added or removed, and/or reordered in whole or in part depending on the particular embodiment, unless stated to the contrary.

The illustrative method 900 begins with block 902 in which the system solves the relaxed master problem, MP–LP, to find a combination of shift schedules according to a given objective function. It should be appreciated that the pool of shift schedule candidates to choose from grows as more columns are found and added. This master problem may be said to be "relaxed" because it allows for choosing fractional shifts for each agent. Such "relaxation" makes the problem linear (thus faster to solve) and allows for calculation of the dual solution. In some embodiments, the system may also calculate a lower bound, $z_i^{LB}$.

In block 904, the system finds columns (i.e., good shift schedules). In particular, in the illustrative embodiment, the system solves a shift schedule sub-problem, S–SP, for each agent or agent grouping. It should be appreciated that the shift schedule sub-problem, S–SP, uses the dual values found when the relaxed master is solved to find good shift schedules (i.e. columns) and to find the reduced cost, $\overline{C}_j^{-a*}$. In block 906, the system may add columns (i.e., shift schedules) for an agent to the relaxed master problem, for example, if the reduced cost, $\overline{C}_j^{-a*}$, is negative.

In block 908, the system evaluates one or more termination criteria associated with terminating the "column generation loop." For example, in the illustrative embodiment, the system may evaluate one or more "optimal" criteria that guarantee that an optimal solution has been found and "suboptimal" criteria that bound the run time of the algorithm in the event that an optimal solution has not been guaranteed to be found within a predefined period (e.g., potentially resulting in a suboptimal solution.

In some embodiments, one such optimal criterion may include determining that there are no new columns to add from S–SP, which indicates that there are no more columns with negative reduced cost (e.g., all "improving" shifts have been identified and the master objective can no longer decrease). It should be appreciated that a single agent's reduced cost is generally not monotonically increasing between iterations. Therefore, in order to find the optimal solution, the system generally we would have to execute the sub-problems for all agent groupings in each iteration. In order to speed up the algorithm, the system may discard agents that did not add columns, and after all remaining are discarded, the system may try once more to see if any other improving shifts have been missed. In some embodiments, suboptimal criteria may include determining that a maximum number of iterations of the "column generation loop" of FIG. 9 has been executed (e.g., 15 iterations), determining that the lower bound is greater than the objective value of the relaxed master problem, MP-LP (i.e., $z_i^{LB} \geq z_i$), and/or determining that $z_i$ did not improve at least a threshold percentage (e.g., 0.1%) over the last predefined number (e.g., three) of iterations (e.g., $z_{i-2}$=0.99 $z_i$).

If the system determines, in block 910, that one or more of the termination criteria has been satisfied (e.g., the optimal criteria and/or suboptimal criteria), the method 900 terminates and returns to block 810 of FIG. 8. However, if the system determines, in block 910, that the termination criteria have not been satisfied, the method 900 returns to block 902 in which the system attempts to add more columns. In some embodiments, it should be appreciated that termination of the method 900 may require that multiple termination criteria be satisfied. Further, in other embodiments, one or more different termination criteria may be used by the system to terminate the method 900.

It should be appreciated that the "column generation loop" of FIG. 9 essentially involves finding a combination of shift schedules that optimizes some objective(s) (e.g., solved by linear programming) to determine a dual solution to use in the sub-problem's objective and, in the sub-problem, finding a valid shift schedule for an agent that optimizes the objective constructed with the duals from the relaxed master problem (e.g., solved by constraint programmer) to determine a valid shift schedule for each or some agent(s).

Although the blocks 902-910 are described in a relatively serial manner, it should be appreciated that various blocks of the method 900 may be performed in parallel in some embodiments.

Referring back to FIG. 8, in block 810, the system solves the integer master problem, MP–IP. In the illustrative embodiment, the integer master problem, MP–IP, is similar to the relaxed master problem, MP–LP, with added integrality constraints that ensure exactly one shift schedule is chosen per agent. In some embodiments, the integer master problem is only solved once, and the pool of shift schedule candidates to choose from contains all valid shift schedules found during column generation. In some embodiments, in order to balance between producing a good (or optimal) solution quality and having a reasonable solve time, the system may implement a set of termination rules in the form of "terminate if the MIP gap is under X % within Y seconds." It should be appreciated that the MIP Gap is the tolerance or difference between the best-found solution yet and the current solution; the closer it is to zero, the more optimal the solution quality is. Such termination criteria are depicted in Table 2 presented below.

TABLE 2

Termination Criteria for MP - IP

| MIP Gap X (%) | 0.5 | 1.0 | 2.0 | 5.0 | 10.0 | 100.0 |
|---|---|---|---|---|---|---|
| Elapsed time Y (sec) | 0 | 150 | 300 | 600 | 1800 | 3600 |

In block 812, the system may perform one or more post-processing steps, for example, to improve the quality and usability of the schedules. For example, in some embodiments, the system may fix agents' shifts and run a small CP formulation to minimize the stacking of activities. This may be done to minimize the number of agents doing the same activity, such as going on meals or break at the same time if possible, which is typically a desirable outcome for contact centers to ensure maximum service performance.

Further, in some embodiments, the system may re-balance the agent allocation to planning groups with another small LP formulation so that each type of interaction receives similar service KPI. For example, when over-staffed, the system may spread the overstaffed agents equally to handle all interaction types, and conversely when under-staffed, the system may allocate the limited agents in such a way that interaction types requiring fewer agents are not neglected at the expense of interaction types requiring more agents. The marginal increase of adding an agent to handle an interaction type with a small requirement is much more than allocating the agent to handle an interaction type with a larger requirement. For example, adding one agent to a requirement of ten agents may yield a 10% increase in service level, whereas the same agent allocated to a one hundred agents requirement may only yield a 1% increase in service level. In block 814, the system may output the optimized shift schedules. For example, in some embodiments, the system may return the resulting schedules for display. In some embodiments, the optimized shift schedules may be automatically incorporated into one or more aspects of the contact center system 1200.

Although the blocks 802-814 are described in a relatively serial manner, it should be appreciated that various blocks of the method 800 may be performed in parallel in some embodiments.

It should be appreciated that the system may utilize various constraints in generating the optimized shift schedules. For example, the table of FIGS. 10-11 identifies various example shift constraints and the corresponding definitions for use in sub-problems.

It should be further appreciated that the formulation described herein may be extended with additional capabilities and may expose customization options for the contact center. For example, in some embodiments, the master problem formulation may have an objective of solving:

$$\sum_a \mu_t^{ar} + z_t^r \geq Req_t^r \quad \forall r, t,$$

(Dual variable = $\delta_t^r$)

subject to:

$$\sum_a \mu_t^{ar} + z_t^r \geq Req_t^r \quad \forall r, t,$$

(Dual variable = $\delta_t^r$)

$$\sum_{j: j \in J_a} Y_{jt}^{ar} \lambda_j^a - \sum_r \mu_t^{ar} \geq 0 \quad \forall t, a,$$

(Dual variable = $\beta_t^a$)

$$\sum_{a, j: j \in J_a} \lambda_j^a = 1 \quad \forall a,$$

(Dual variable = $\sigma^a$)

for $z_t^r, \mu_t^{ar} \geq 0 \; \forall a, j: j \in J_a, r, t$. The first constraint is the demand constraint, the second set of constraints links agent decision variables $\lambda_j^a$ with planning group assignment decision variables $\mu_t^{ar}$, and the third set of constraints ensured that all agents must be scheduled. It should be appreciated that the MP-LP formulation may drop the integrality constraints of variables $\lambda_j^a$.

In the aforementioned master problem configuration, the indices are defined according to i≜iteration, a≜agents, r≜planning groups, j≜shift schedule or column, and t≜period or time interval. Further, the sets are defined according to $J_a$≜set of shift schedules for agent group a, and T≜set of time intervals. The parameters are defined according to $C^r$≜marginal cost per agent of understaffing work for planning group r, $C_j^a$≜cost of shift schedule j if assigned to agent a, $Y_{jt}^{ar}$≜1 if agent a is working planning group r during period t of shift schedule j (and 0, otherwise), and $Req_t^r$≜requirement for planning group r at period t. And the decision variables are defined according to $\lambda_j^a$≜1 if shift schedule j is assigned to agent a (and 0, otherwise), $z_t^r$≜understaffing at time t for planning group r, and $\mu_t^{ar}$≜staffing requirements of planning group r covered by agent a at time t.

As described above, the master problem lower bound may be used to terminate the algorithm. In particular, the lower bound is valid for every iteration i in the column generation algorithm, and the system uses this lower bound to terminate the algorithm if current lower bound $z_i^{LB}$ is greater than $z_i$. The lower bound may be calculated according to:

$$z_i^{LB} = \left[ z_i + \sum_{a, j: j \in J_a} \overline{C}_j^{a*} \lambda_j^a \right]$$

and the lower bound may be updated according to:

$$Z_i^{LB} = \max(z_{i-1}^{LB}, z_i^{LB}).$$

It should be appreciated that the master problem formulation may minimize (or reduce) shift cost and understaffing, given parameters for labor cost and a penalty for missing requirement. In other embodiments, an objective may be substituted with the appropriate changes to the lower bound. Therefore, it should be appreciated that this approach can support any number of custom objectives or multi-objective optimizations (e.g., minimize shift cost while maximizing service level and agent preferences). Multi-objective scheduling optimization allows the system to provide several, similarly "optimal," shift schedule solutions and allow the end users choose depending on the objectives that are more important for their contact center.

It should be appreciated that the master problem may still be difficult to solve from the complexity of the agent capability and planning group network. Accordingly, in other embodiments, aggregation and clustering of planning groups may be performed to decrease or reduce the dimensionality of the problem, which allows for potential splitting or decomposition of the problem into independent subnetworks of agents and planning groups (e.g., for scheduling in parallel using the column generation algorithm described above).

Although the formulation described above is deterministic (e.g., assuming all parameters as certain), it should be appreciated that other types of models may be used in other embodiments. For example, in some embodiments, stochastic versions may be formulated that incorporate uncertainties in the contact center, such as workload forecast discrepancies and agent adherence to create what-if scenarios for best- and worst-case macro and/or micro economic outlook during the planning horizon of the contact center.

It should be appreciated that the sub-problem formulations described herein may similarly address various objectives given certain constraints and assumptions. In some embodiments, the relevant sets may be defined according to $R_a$≜set of planning groups that agent a can support requirements for, where: $R_a \subseteq R$, the parameters may be defined according to $\delta_t^r$, $\sigma^a$≜dual values from relaxed master problem and $C^w$≜cost of labor, and the decision variables may be defined according to $y_t^r$≜1 if working planning group r at time t (and 0, otherwise), $w_t^j$≜1 if period t is a paid work interval for shift schedule j (and 0, otherwise), and $C_j^a$≜cost of shift schedule j if assigned to agent a, $C_j^a = C^w \sum_t w_t^j$.

As indicated above, at initialization, dual values are not available. Therefore, for each agent, the system may find one or more initial shifts by finding those shifts that cover requirements the most. The expression for this objective (for $S_{tint}$–SP) may be:

$$\max \sum_t MaxReq_t y_t$$

where $$MaxReq_t = \max_r Req_t^r, \; \forall t.$$

Further, at every iteration, the dual values may be found by solving the relaxed master problem. According, the dual values may be sent to S–SP and used to calculate the reduced cost of new shift columns for each agent a according to:

$$\min \overline{C}_j^a = C_j^a + \sigma^a - \sum_t \beta_t^a y_t^a$$

In some embodiments, both $s_{init}$-SP and S-SP share the same set of constraints. Further, as indicated above, the table in FIGS. 10-11 lists various constraints and their corresponding definitions. In some embodiments, the system assumes that all shift constraints are hard constraints (i.e., meaning they must be met) and agents' constraints do not change from schedule start to end (but they can rotate between different constraints). Of course, it should be appreciated that the system may leverage different constraints and/or assumptions in different embodiments.

Figure 12:
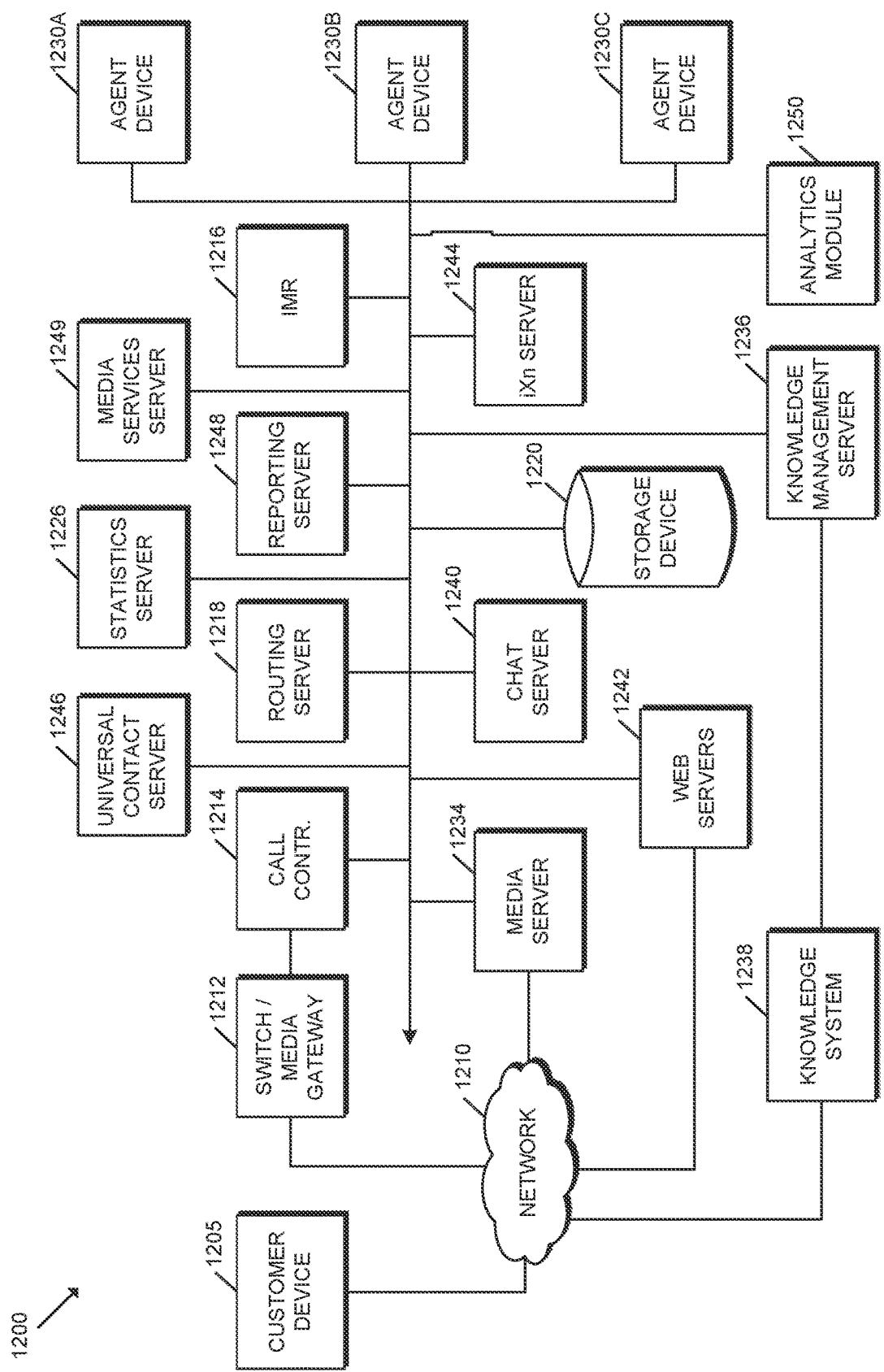
FIG. 12 is a simplified block diagram of at least one embodiment of a call center system.

Referring now to FIG. 12, a simplified block diagram of at least one embodiment of a communications infrastructure and/or content center system, which may be used in conjunction with one or more of the embodiments described herein, is shown. The contact center system 1200 may be embodied as any system capable of providing contact center services (e.g., call center services, chat center services, SMS center services, etc.) to an end user and otherwise performing the functions described herein. The illustrative contact center system 1200 includes a customer device 1205, a network 1210, a switch/media gateway 1212, a call controller 1214, an interactive media response (IMR) server 1216, a routing server 1218, a storage device 1220, a statistics server 1226, agent devices 1230A, 1230B, 1230C, a media server 1234, a knowledge management server 1236, a knowledge system 1238, chat server 1240, web servers 1242, an interaction (iXn) server 1244, a universal contact server 1246, a reporting server 1248, a media services server 1249, and an analytics module 1250. Although only one customer device 1205, one network 1210, one switch/media gateway 1212, one call controller 1214, one IMR server 1216, one routing server 1218, one storage device 1220, one statistics server 1226, one media server 1234, one knowledge management server 1236, one knowledge system 1238, one chat server 1240, one iXn server 1244, one universal contact server 1246, one reporting server 1248, one media services server 1249, and one analytics module 1250 are shown in the illustrative embodiment of FIG. 12, the contact center system 1200 may include multiple customer devices 1205, networks 1210, switch/media gateways 1212, call controllers 1214, IMR servers 1216, routing servers 1218, storage devices 1220, statistics servers 1226, media servers 1234, knowledge management servers 1236, knowledge systems 1238, chat servers 1240, iXn servers 1244, universal contact servers 1246, reporting servers 1248, media services servers 1249, and/or analytics modules 1250 in other embodiments. Further, in some embodiments, one or more of the components described herein may be excluded from the system 1200, one or more of the components described as being independent may form a portion of another component, and/or one or more of the component described as forming a portion of another component may be independent.

It should be understood that the term "contact center system" is used herein to refer to the system depicted in FIG. 12 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 1200), the associated customer service provider (such as a particular customer service provider providing customer services through the contact center system 1200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 1200 may be used by a customer service provider to provide various types of services to customers. For example, the contact center system 1200 may be used to engage and manage interactions in which automated processes (or bots) or human agents communicate with customers. As should be understood, the contact center system 1200 may be an in-house facility to a business or enterprise for performing the functions of sales and customer service relative to products and services available through the enterprise. In another embodiment, the contact center system 1200 may be operated by a third-party service provider that contracts to provide services for another organization. Further, the contact center system 1200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 1200 may include software applications or programs, which may be executed on premises or remotely or some combination thereof. It should further be appreciated that the various components of the contact center system 1200 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 1300, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

Figure 13:
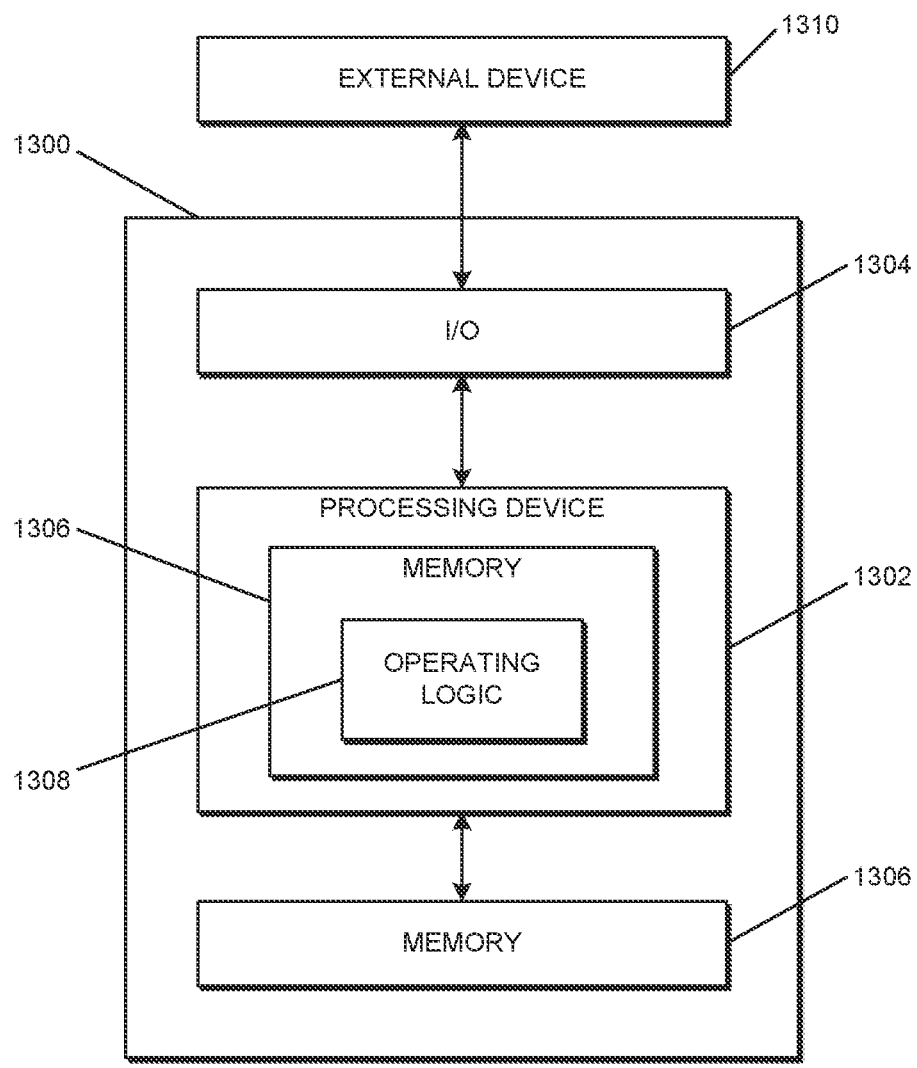
FIG. 13 is a simplified block diagram of at least one embodiment of a computing system.

It should be understood that any of the computer-implemented components, modules, or servers described in relation to FIG. 12 may be implemented via one or more types of computing devices, such as, for example, the computing device 1300 of FIG. 13. As will be seen, the contact center system 1200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 1200 may initiate inbound communications (e.g., telephone calls, emails, chats, etc.) to the contact center system 1200 via a customer device 1205. While FIG. 12 shows one such customer device—i.e., customer devices 1205—it should be understood that any number of customer devices 1205 may be present. The customer devices 1205, for example, may be a communication device, such as a telephone, smart phone, computer, tablet, or laptop. In accordance with functionality described herein, customers may generally use the customer devices 1205 to initiate, manage, and conduct communications with the contact center system 1200, such as telephone calls, emails, chats, text messages, web-browsing sessions, and other multimedia transactions.

Inbound and outbound communications from and to the customer devices 1205 may traverse the network 1210, with the nature of the network typically depending on the type of customer device being used and the form of communication. As an example, the network 1210 may include a communication network of telephone, cellular, and/or data services. The network 1210 may be a private or public switched telephone network (PSTN), local area network (LAN), private wide area network (WAN), and/or public WAN such as the Internet. Further, the network 1210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 1212 may be coupled to the network 1210 for receiving and transmitting telephone calls between customers and the contact center system 1200. The switch/media gateway 1212 may include a telephone or communication switch configured to function as a central switch for agent level routing within the center. The switch may be a hardware switching system or implemented via software. For example, the switch 1212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 1230. Thus, in general, the switch/media gateway 1212 establishes a voice connection between the customer and the agent by establishing a connection between the customer device 1205 and agent device 1230.

As further shown, the switch/media gateway 1212 may be coupled to the call controller 1214 which, for example, serves as an adapter or interface between the switch and the other routing, monitoring, and communication-handling components of the contact center system 1200. The call controller 1214 may be configured to process PSTN calls, VoIP calls, and/or other types of calls. For example, the call controller 1214 may include computer-telephone integration (CTI) software for interfacing with the switch/media gateway and other components. The call controller 1214 may include a session initiation protocol (SIP) server for processing SIP calls. The call controller 1214 may also extract data about an incoming interaction, such as the customer's telephone number, IP address, or email address, and then communicate these with other contact center components in processing the interaction.

The interactive media response (IMR) server 1216 may be configured to enable self-help or virtual assistant functionality. Specifically, the IMR server 1216 may be similar to an interactive voice response (IVR) server, except that the IMR server 1216 is not restricted to voice and may also cover a variety of media channels. In an example illustrating voice, the IMR server 1216 may be configured with an IMR script for querying customers on their needs. For example, a contact center for a bank may instruct customers via the IMR script to "press 1" if they wish to retrieve their account balance. Through continued interaction with the IMR server 1216, customers may receive service without needing to speak with an agent. The IMR server 1216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 1218 may function to route incoming interactions. For example, once it is determined that an inbound communication should be handled by a human agent, functionality within the routing server 1218 may select the most appropriate agent and route the communication thereto. This agent selection may be based on which available agent is best suited for handling the communication. More specifically, the selection of appropriate agent may be based on a routing strategy or algorithm that is implemented by the routing server 1218. In doing this, the routing server 1218 may query data that is relevant to the incoming interaction, for example, data relating to the particular customer, available agents, and the type of interaction, which, as described herein, may be stored in particular databases. Once the agent is selected, the routing server 1218 may interact with the call controller 1214 to route (i.e., connect) the incoming interaction to the corresponding agent device 1230. As part of this connection, information about the customer may be provided to the selected agent via their agent device 1230. This information is intended to enhance the service the agent is able to provide to the customer.

It should be appreciated that the contact center system 1200 may include one or more mass storage devices—represented generally by the storage device 1220—for storing data in one or more databases relevant to the functioning of the contact center. For example, the storage device 1220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 1220 may store agent data in an agent database. Agent data maintained by the contact center system 1200 may include, for example, agent availability and agent profiles, schedules, skills, handle time, and/or other relevant data. As another example, the storage device 1220 may store interaction data in an interaction database. Interaction data may include, for example, data relating to numerous past interactions between customers and contact centers. More generally, it should be understood that, unless otherwise specified, the storage device 1220 may be configured to include databases and/or store data related to any of the types of information described herein, with those databases and/or data being accessible to the other modules or servers of the contact center system 1200 in ways that facilitate the functionality described herein. For example, the servers or modules of the contact center system 1200 may query such databases to retrieve data stored therein or transmit data thereto for storage. The storage device 1220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 1226 may be configured to record and aggregate data relating to the performance and operational aspects of the contact center system 1200. Such information may be compiled by the statistics server 1226 and made available to other servers and modules, such as the reporting server 1248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 1230 of the contact center system 1200 may be communication devices configured to interact with the various components and modules of the contact center system 1200 in ways that facilitate functionality described herein. An agent device 1230, for example, may include a telephone adapted for regular telephone calls or VoIP calls. An agent device 1230 may further include a computing device configured to communicate with the servers of the contact center system 1200, perform data processing associated with operations, and interface with customers via voice, chat, email, and other multimedia communication mechanisms according to functionality described herein. Although FIG. 12 shows three such agent devices 1230—i.e., agent devices 1230A, 1230B and 1230C—it should be understood that any number of agent devices 1230 may be present in a particular embodiment.

The multimedia/social media server 1234 may be configured to facilitate media interactions (other than voice) with the customer devices 1205 and/or the servers 1242. Such media interactions may be related, for example, to email, voice mail, chat, video, text-messaging, web, social media, co-browsing, etc. The multi-media/social media server 1234 may take the form of any IP router conventional in the art with specialized hardware and software for receiving, processing, and forwarding multi-media events and communications.

The knowledge management server 1236 may be configured to facilitate interactions between customers and the knowledge system 1238. In general, the knowledge system 1238 may be a computer system capable of receiving questions or queries and providing answers in response. The knowledge system 1238 may be included as part of the contact center system 1200 or operated remotely by a third party. The knowledge system 1238 may include an artificially intelligent computer system capable of answering questions posed in natural language by retrieving information from information sources such as encyclopedias, dictionaries, newswire articles, literary works, or other documents submitted to the knowledge system 1238 as reference materials. As an example, the knowledge system 1238 may be embodied as IBM Watson or a similar system.

The chat server 1240, it may be configured to conduct, orchestrate, and manage electronic chat communications with customers. In general, the chat server 1240 is configured to implement and maintain chat conversations and generate chat transcripts. Such chat communications may be conducted by the chat server 1240 in such a way that a customer communicates with automated chatbots, human agents, or both. In exemplary embodiments, the chat server 1240 may perform as a chat orchestration server that dispatches chat conversations among the chatbots and available human agents. In such cases, the processing logic of the chat server 1240 may be rules driven so to leverage an intelligent workload distribution among available chat resources. The chat server 1240 further may implement, manage, and facilitate user interfaces (UIs) associated with the chat feature, including those UIs generated at either the customer device 1205 or the agent device 1230. The chat server 1240 may be configured to transfer chats within a single chat session with a particular customer between automated and human sources such that, for example, a chat session transfers from a chatbot to a human agent or from a human agent to a chatbot. The chat server 1240 may also be coupled to the knowledge management server 1236 and the knowledge systems 1238 for receiving suggestions and answers to queries posed by customers during a chat so that, for example, links to relevant articles can be provided.

The web servers 1242 may be included to provide site hosts for a variety of social interaction sites to which customers subscribe, such as Facebook, Twitter, Instagram, etc. Though depicted as part of the contact center system 1200, it should be understood that the web servers 1242 may be provided by third parties and/or maintained remotely. The web servers 1242 may also provide webpages for the enterprise or organization being supported by the contact center system 1200. For example, customers may browse the webpages and receive information about the products and services of a particular enterprise. Within such enterprise webpages, mechanisms may be provided for initiating an interaction with the contact center system 1200, for example, via web chat, voice, or email. An example of such a mechanism is a widget, which can be deployed on the webpages or websites hosted on the web servers 1242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 1244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 1244 may be configured to interact with the routing server 1218 for selecting an appropriate agent to handle each of the deferrable activities. Once assigned to a particular agent, the deferrable activity is pushed to that agent so that it appears on the agent device 1230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 1230 may include a workbin. As an example, a workbin may be maintained in the buffer memory of the corresponding agent device 1230.

The universal contact server (UCS) 1246 may be configured to retrieve information stored in the customer database and/or transmit information thereto for storage therein. For example, the UCS 1246 may be utilized as part of the chat feature to facilitate maintaining a history on how chats with a particular customer were handled, which then may be used as a reference for how future chats should be handled. More generally, the UCS 1246 may be configured to facilitate maintaining a history of customer preferences, such as preferred media channels and best times to contact. To do this, the UCS 1246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 1248 may be configured to generate reports from data compiled and aggregated by the statistics server 1226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 1249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 1250 may be configured to provide systems and methods for performing analytics on data received from a plurality of different data sources as functionality described herein may require. In accordance with example embodiments, the analytics module 1250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 1250 may have access to the data stored in the storage device 1220, including the customer database and agent database. The analytics module 1250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 1250 may be configured to retrieve data stored within the storage device 1220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 1250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 1250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 12 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 1200 may be affected through user interfaces (UIs) which may be generated on the customer devices 1205 and/or the agent devices 1230. As already noted, the contact center system 1200 may operate as a hybrid system in which some or all components are hosted remotely, such as in a cloud-based or cloud computing environment. It should be appreciated that each of the devices of the contact center system 1200 may be embodied as, include, or form a portion of one or more computing devices similar to the computing device 1300 described below in reference to FIG. 13.

Referring now to FIG. 13, a simplified block diagram of at least one embodiment of a computing device 1300 is shown. The illustrative computing device 1300 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 1300, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 1200 of FIG. 12—the various servers and computer devices thereof may be located on local computing devices 1300 (e.g., on-site at the same physical location as the agents of the contact center), remote computing devices 1300 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 1300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 1300 includes a processing device 1302 that executes algorithms and/or processes data in accordance with operating logic 1308, an input/output device 1304 that enables communication between the computing device 1300 and one or more external devices 1310, and memory 1306 which stores, for example, data received from the external device 1310 via the input/output device 1304.

The input/output device 1304 allows the computing device 1300 to communicate with the external device 1310. For example, the input/output device 1304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 1300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 1300. The input/output device 1304 may include hardware, software, and/or firmware suitable for performing the techniques described herein.

The external device 1310 may be any type of device that allows data to be inputted or outputted from the computing device 1300. For example, in various embodiments, the external device 1310 may be embodied as one or more of the devices/systems described herein, and/or a portion thereof. Further, in some embodiments, the external device 1310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1310 may be integrated into the computing device 1300.

The processing device 1302 may be embodied as any type of processor(s) capable of performing the functions described herein. In particular, the processing device 1302 may be embodied as one or more single or multi-core processors, microcontrollers, or other processor or processing/controlling circuits. For example, in some embodiments, the processing device 1302 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 1302 may be a programmable type, a dedicated hardwired state machine, or a combination thereof. Processing devices 1302 with multiple processing units may utilize distributed, pipelined, and/or parallel processing in various embodiments. Further, the processing device 1302 may be dedicated to performance of just the operations described herein, or may be utilized in one or more additional applications. In the illustrative embodiment, the processing device 1302 is programmable and executes algorithms and/or processes data in accordance with operating logic 1308 as defined by programming instructions (such as software or firmware) stored in memory 1306. Additionally or alternatively, the operating logic 1308 for processing device 1302 may be at least partially defined by hardwired logic or other hardware. Further, the processing device 1302 may include one or more components of any type suitable to process the signals received from input/output device 1304 or from other components or devices and to provide desired output signals. Such components may include digital circuitry, analog circuitry, or a combination thereof.

The memory 1306 may be of one or more types of non-transitory computer-readable media, such as a solid-state memory, electromagnetic memory, optical memory, or a combination thereof. Furthermore, the memory 1306 may be volatile and/or nonvolatile and, in some embodiments, some or all of the memory 1306 may be of a portable type, such as a disk, tape, memory stick, cartridge, and/or other suitable portable memory. In operation, the memory 1306 may store various data and software used during operation of the computing device 1300 such as operating systems, applications, programs, libraries, and drivers. It should be appreciated that the memory 1306 may store data that is manipulated by the operating logic 1308 of processing device 1302, such as, for example, data representative of signals received from and/or sent to the input/output device 1304 in addition to or in lieu of storing programming instructions defining operating logic 1308. As shown in FIG. 13, the memory 1306 may be included with the processing device 1302 and/or coupled to the processing device 1302 depending on the particular embodiment. For example, in some embodiments, the processing device 1302, the memory 1306, and/or other components of the computing device 1300 may form a portion of a system-on-a-chip (SoC) and be incorporated on a single integrated circuit chip.

In some embodiments, various components of the computing device 1300 (e.g., the processing device 1302 and the memory 1306) may be communicatively coupled via an input/output subsystem, which may be embodied as circuitry and/or components to facilitate input/output operations with the processing device 1302, the memory 1306, and other components of the computing device 1300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1300 may include other or additional components, such as those commonly found in a typical computing device (e.g., various input/output devices and/or other components), in other embodiments. It should be further appreciated that one or more of the components of the computing device 1300 described herein may be distributed across multiple computing devices. In other words, the techniques described herein may be employed by a computing system that includes one or more computing devices. Additionally, although only a single processing device 1302, I/O device 1304, and memory 1306 are illustratively shown in FIG. 13, it should be appreciated that a particular computing device 1300 may include multiple processing devices 1302, I/O devices 1304, and/or memories 1306 in other embodiments. Further, in some embodiments, more than one external device 1310 may be in communication with the computing device 1300.

The computing device 1300 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 1300 may communicate with other computing devices 1300 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 1300 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

What is claimed is:

1. A system for performing contact center agent scheduling, the system comprising:
   at least one processor; and
   at least one memory comprising a plurality of instructions stored thereon that, in response to execution by the at least one processor, causes the system to:
      automatically generate one of a batch process workload forecast model or an ad hoc workload forecast model based on automatic call distribution data of the contact center by:
         receiving historical time series data to be forecasted;
         performing hierarchical time dimension extraction;
         performing outlier detection and pattern recognition; and
         comparing forecasting methodologies using cross-validation with multiple folds for multiple validation time horizons;
      generate a workload forecast indicative of a demand that will be introduced into the contact center in a future planning period based on the automatically generated workload forecast model and time series data;
      generate a staffing requirement forecast indicative of a number of agents required to handle the workload forecast based on the workload forecast, one or more service goals, and a staffing requirement model; and
      perform schedule optimization using column generation to generate an optimized contact center agent shift schedule for a plurality of agents based on the staffing requirement forecast and one or more constraints.

2. The system of claim 1, wherein each column added during the column generation corresponds with a prospective shift schedule.

3. The system of claim 1, wherein the one or more constraints comprises at least one of a maximum shift duration, an earliest shift starting time, or a latest shift finishing time.

4. The system of claim 1, wherein performing outlier detection and pattern recognition comprises detecting seasonality and trends in the data.

5. The system of claim 1, wherein to perform schedule optimization using column generation comprises to solve a relaxed master problem and add columns until at least one termination criteria has been satisfied.

6. The system of claim 5, wherein the at least one termination criteria comprises a determination that no new columns are available to add or a determination that a threshold number of iterations of column generation has been reached.

7. The system of claim 1, further comprising a contact center system; and
   wherein the plurality of instructions further causes the system to automatically incorporate the optimized contact center agent shift schedule into the contact center system.

8. The system of claim 1, wherein to generate the workload forecast comprises to generate the workload forecast in response to receipt of an API request for an optimized contact center agent schedule.

9. The system of claim 1, wherein to perform schedule optimization using column generation to generate the optimized contact center agent shift schedule for the plurality of agents comprises to use column generation with linear programming and constraint programming in conjunction with an optimization programming language.

10. One or more non-transitory machine-readable storage media comprising a plurality of instructions stored thereon that, in response to execution by at least one processor, causes a system to:
   automatically generate one of a batch process workload forecast model or an ad hoc workload forecast model based on automatic call distribution data of the contact center by:
      receiving historical time series data to be forecasted;
      performing hierarchical time dimension extraction;
      performing outlier detection and pattern recognition; and
      comparing forecasting methodologies using cross-validation with multiple folds for multiple validation time horizons;
   generate a workload forecast indicative of a demand that will be introduced into a contact center in a future planning period based on the automatically generated workload forecast model and time series data;
   generate a staffing requirement forecast indicative of a number of agents required to handle the workload forecast based on the workload forecast, one or more service goals, and a staffing requirement model; and
   perform schedule optimization using column generation to generate an optimized contact center agent shift schedule for a plurality of agents based on the staffing requirement forecast and one or more constraints.

11. The one or more non-transitory machine-readable storage media of claim 10, wherein each column added during the column generation corresponds with a prospective shift schedule.

12. The one or more non-transitory machine-readable storage media of claim 10, wherein the one or more constraints comprises at least one of a maximum shift duration, an earliest shift starting time, or a latest shift finishing time.

13. The one or more non-transitory machine-readable storage media of claim 10, wherein performing outlier detection and pattern recognition comprises detecting seasonality and trends in the data.

14. The one or more non-transitory machine-readable storage media of claim 10, wherein to perform schedule optimization using column generation comprises to solve a relaxed master problem and add columns until at least one termination criteria has been satisfied.

15. The one or more non-transitory machine-readable storage media of claim 14, wherein the at least one termination criteria comprises a determination that no new columns are available to add or a determination that a threshold number of iterations of column generation has been reached.

16. A method of performing contact center agent scheduling, the method comprising:
   automatically generating, by a contact center system, one of a batch process workload forecast model or an ad hoc workload forecast model based on automatic call distribution data of the contact center by (i) receiving historical time series data to be forecasted, performing hierarchical time dimension extraction, performing outlier detection and pattern recognition, and comparing forecasting methodologies using cross-validation with multiple folds for multiple validation time horizons;
   generating, by the contact center system, a workload forecast indicative of a demand that will be introduced into the contact center in a future planning period based on the automatically generated workload forecast model and time series data;
   generating, by the contact center system, a staffing requirement forecast indicative of a number of agents required to handle the workload forecast based on the workload forecast, one or more service goals, and a staffing requirement model; and
   performing, by the contact center system, schedule optimization using column generation to generate an optimized contact center agent shift schedule for a plurality of agents based on the staffing requirement forecast and one or more constraints.

17. The method of claim 16, wherein each column added during the column generation corresponds with a prospective shift schedule.

18. The method of claim 17, wherein performing schedule optimization using column generation comprises solving a relaxed master problem and adding columns until at least one termination criteria has been satisfied.

19. The method of claim 16, wherein performing outlier detection and pattern recognition comprises detecting seasonality in the data.

20. The method of claim 16, wherein performing outlier detection and pattern recognition comprises detecting trends in the data.

* * * * *